US009898724B2

(12) United States Patent
Roh et al.

(10) Patent No.: US 9,898,724 B2
(45) Date of Patent: Feb. 20, 2018

(54) METHOD AND APPARATUS FOR DETERMINING ITEM BASED ON INTERACTION ENVIRONMENT

(71) Applicant: SAMSUNG ELECTRONICS CO., LTD., Suwon-si (KR)

(72) Inventors: Yeon-hee Roh, Seoul (KR); Eun-young Lim, Seoul (KR); Young-shil Jang, Suwon-si (KR); Jae-woo Ko, Uiwang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 836 days.

(21) Appl. No.: 13/975,416

(22) Filed: Aug. 26, 2013

(65) Prior Publication Data

US 2014/0058860 A1 Feb. 27, 2014

(30) Foreign Application Priority Data

Aug. 24, 2012 (KR) ........................ 10-2012-0093294
Aug. 13, 2013 (KR) ........................ 10-2013-0096193

(51) Int. Cl.
*G06Q 20/20* (2012.01)
*G06Q 20/22* (2012.01)
*G06Q 20/32* (2012.01)

(52) U.S. Cl.
CPC ......... *G06Q 20/204* (2013.01); *G06Q 20/227* (2013.01); *G06Q 20/325* (2013.01); *G06Q 20/3224* (2013.01); *G06Q 20/3278* (2013.01)

(58) Field of Classification Search
None
See application file for complete search history.

(56) References Cited

U.S. PATENT DOCUMENTS 6,460,138 B1 * 10/2002 Morris ................. G06Q 20/341 713/168
7,413,113 B1 8/2008 Zhu
(Continued)

FOREIGN PATENT DOCUMENTS

CN 101625620 A 1/2010
CN 101842794 A 9/2010
(Continued)

OTHER PUBLICATIONS

Communication from the European Patent Office dated Jun. 4, 2014 in a counterpart European Application No. 13181545.8.
(Continued)

*Primary Examiner* — F. Zeender
*Assistant Examiner* — Denisse Ortiz Roman
(74) *Attorney, Agent, or Firm* — Sughrue Mion, PLLC

(57) ABSTRACT

A method and an apparatus for using a device to determine an item, such as, for example, a card based on an interaction environment, such as, for example, a settlement environment, are provided. The method by which a device determines a card to be used in a settlement includes: acquiring a card use history of a card, which is stored in the device; acquiring information which relates to a settlement environment of the device; determining a card to be used in the settlement, based on the acquired information relating to the settlement environment and the acquired card use history; and providing settlement information which relates to the determined card to a point of sale (POS) terminal.

23 Claims, 14 Drawing Sheets

(56) References Cited

U.S. PATENT DOCUMENTS

| | | | | |
|---|---|---|---|---|
| 8,719,153 | B2 | 5/2014 | Barry | |
| 9,710,139 | B2 | 7/2017 | Yoo | |
| 2009/0037326 | A1* | 2/2009 | Chitti | G06Q 20/10 705/39 |
| 2010/0063906 | A1 | 3/2010 | Nelsen et al. | |
| 2010/0082487 | A1 | 4/2010 | Nelsen | |
| 2010/0217707 | A1 | 8/2010 | Phillips | |
| 2010/0262537 | A1 | 10/2010 | Park | |
| 2011/0153402 | A1 | 6/2011 | Craig | |
| 2012/0150601 | A1 | 6/2012 | Fisher | |
| 2013/0136363 | A1 | 5/2013 | Na | |

FOREIGN PATENT DOCUMENTS

| | | | |
|---|---|---|---|
| CN | 102187353 | A | 9/2011 |
| EA | 200500437 | A1 | 8/2005 |
| JP | 2003-76927 | A | 3/2003 |
| JP | 2007-102319 | A | 4/2007 |
| JP | 2009140035 | A | 6/2009 |
| KR | 10-2011-0001042 | A | 1/2011 |
| KR | 10-2011-0001045 | A | 1/2011 |
| KR | 1020110115264 | A | 10/2011 |
| KR | 10-2012-0013867 | A | 2/2012 |
| KR | 10-2012-0014480 | A | 2/2012 |
| KR | 1020120014447 | A | 2/2012 |
| WO | 2007/116521 | A1 | 10/2007 |
| WO | 2009/018255 | A2 | 2/2009 |
| WO | 2011/032263 | A1 | 3/2011 |
| WO | 2012/010585 | A1 | 1/2012 |

OTHER PUBLICATIONS

Search Report dated Nov. 21, 2013, issued by the International Searching Authority in counterpart International Application No. PCT/KR2013/007313.

Written Opinion dated Nov. 21, 2013, issued by the International Searching Authority in counterpart International Application No. PCT/KR2013/007313.

Communication dated Jan. 11, 2017 issued by the Russian Patent Office in counterpart Russian Patent Application No. 2015110261.

Communication issued by the Japanese Patent Office dated Jul. 31, 2017 in counterpart Japanese Patent Application No. 2013-173101.

Communication issued by the State Intellectual Property Office of P.R. China dated Oct. 9, 2017 in counterpart Chinese Patent Application No. 201310376039.9.

Hasimoto Kaznori, "iPhone 4S business utilization guide", Dec. 5, 2011, total 4 pages, first edition.

Tokoro Yuta, "iPhone programming UIKit Shanghai Reference", Jan. 23, 2010, total 5 pages, first edition.

Mac Fan, Mainabi Co., Ltd., "Mac Fan", Jul. 3, 2012, vol. 20, No. 8, (p. 58,3 Pages Total).

Communication dated Nov. 20, 2017, from the Japanese Patent Office in counterpart application No. 2013-173101.

* cited by examiner

FIG. 4

| | 40 | 42 | 44 | 46 | 48 |
|---|---|---|---|---|---|
| | TIME | MEMBER STORE | AMOUNT OF MONEY | POINTS LIMIT | SETTLEMENT PURPOSE |
| | 11:00~14:00 | STORE A | 30,000 WON OR LESS | 30,000 WON PER MONTH | TRANSPORTATION EXPENSES |
| CARD A | 1 | 2 | 2 | 3 | 2 |
| CARD B | 2 | 4 | 1 | 2 | 3 |
| CARDC | 3 | 1 | 3 | 1 | 4 |
| CARD D | 4 | 3 | 4 | 4 | 1 |
| WEIGHT VALUE | 10 | 10 | 20 | 40 | 60 |

FIG. 5

| CARD | BENEFITS |
|---|---|
| CARD A | 10% DISCOUNT |
| CARD B | 1,000 POINT ACCUMULATION |
| CARD C | 1,000 WON COUPON OFFERING |

METHOD AND APPARATUS FOR DETERMINING ITEM BASED ON INTERACTION ENVIRONMENT

CROSS-REFERENCE TO RELATED PATENT APPLICATION

This application claims priority from Korean Patent Application No. 10-2012-0093294, filed on Aug. 24, 2012, and Korean Patent Application No. 10-2013-0096193, filed on Aug. 13, 2013, in the Korean Intellectual Property Office, the disclosures of which are incorporated herein by reference in their entireties.

BACKGROUND

1. Field

Exemplary embodiments relate to a method and apparatus for determining an item, such as, for example, a card, which is used in an interaction, such as, for example, a settlement, based on an interaction environment, such as, for example, a settlement environment.

2. Description of the Related Art

Due to the rapid development of the computer network environment, internet-based electronic commerce is in widespread use by the public. When purchasing goods online, an account transfer between banks and a credit card are often used as a settlement method, and recently, electronic money, which may be in the form of an electronic wallet or electronic cards, has been widely used.

In addition, recently, at the time of bank financial transactions or commercial transactions, payment settlements using a mobile terminal have increased. A memory capacity of a chip card has been greatly increased in conjunction with the development of an integrated circuit (IC) chip card, and thus, multiple cards may be stored in a single chip card. A side key or a hot key is attached to one side of a mobile terminal which is mounted with an IC chip card, and may be used at the time of a payment settlement. However, in order for a user to settle up by using a card stored in a mobile terminal, a settlement key should be pressed after unlocking the mobile terminal and then selecting a desired card by pressing an operation key via a menu-driven interface, which results in a great deal of inconvenience.

SUMMARY

Exemplary embodiments provide a method and apparatus that determine a suitable card with respect to various settlement environments and facilitate performance of a settlement by using the determined card.

According to an aspect of one or more exemplary embodiments, there is provided a method for determining, by using a device, a card to be used in a settlement, the method including: acquiring a card use history of a card which is usable via the device; acquiring information which relates to a settlement environment of the device; determining, by using the device, the card to be used in the settlement, based on the acquired information which relates to the settlement environment and the acquired card use history; and providing settlement information which relates to the determined card to a point of sale (POS) terminal.

The acquiring the information which relates to the settlement environment may include acquiring information which relates to a location of the device, and the determining the card may include determining the card to be used in the settlement based on the acquired information which relates to the location of the device.

The determining the card may include extracting cards which relate to the settlement environment based on the card use history, comparing respective benefits of the extracted cards with each other, and using a result of the comparing to determine a recommendation with respect to a card to be used in the settlement.

The card use history may include at least one of a card number, a settlement time, a settlement date, a settlement location, and a name of goods.

An image of the card which relates to the determined recommendation may be displayed on an unlock screen of the device, and the determining the card may include determining the card based on a received user input which relates to the card image displayed on the unlock screen of the device.

When the settlement to be conducted by using the determined card is safely performable, at least a portion of a settlement window of the determined card may be displayed in a predetermined color.

The method may further include receiving information which relates to goods from the POS terminal, wherein the received information which relates to the goods includes at least one of a current date, a current time, an expiration date of the goods, an identification value of the goods, a cost of the goods, and an identification value of a member store which corresponds to the POS terminal.

The method may further include determining a display mode of the device, wherein the determining the card includes determining whether to display a list of recommended cards on a screen of the device based on the determined display mode and selecting a card to be used in the settlement based on a received user input which relates to the displayed list of recommended cards.

The display mode may include at least one of a horizontal view mode and a vertical view mode.

The receiving the information which relates to the goods from the POS terminal may include receiving the information which relates to the goods from the POS terminal via near field communication (NFC), and the providing the settlement information which relates to the determined card may include providing the settlement information to the POS terminal via NFC.

According to another aspect of one or more exemplary embodiments, there is provided a device for determining a card to be used in a settlement, the device including: a card history storage which is configured to store a card use history of a card which is usable via the device; a settlement environment information acquirer which is configured to acquire information which relates to a settlement environment of the device; a card selector which is configured to select a card to be used in the settlement, based on the acquired information which relates to the settlement environment and the stored card use history; and a card information provider which is configured to provide settlement information which relates to the selected card to a point of sale (POS) terminal.

The settlement environment information acquirer may be further configured to acquire information which relates to a location of the device, and the card selector may be further configured to determine the card to be used in the settlement based on the acquired information which relates to the location of the device.

The card selector may be further configured to extract cards which relate to the settlement environment based on the stored card use history, to compare respective benefits of the extracted cards with each other, and to use a result of the comparison to determine a recommendation with respect to a card to be used in the settlement.

The card use history may include at least one of a card number, a settlement time, a settlement date, a settlement location, and a name of goods.

An image of the card which relates to the determined recommendation may be displayed on an unlock screen of the device, and the card selector may be further configured to select the card based on a received user input which relates to the card image displayed on the unlock screen of the device.

When the settlement to be conducted by using the selected card is safely performable, at least a portion of a settlement window of the selected card may be displayed in a predetermined color.

The card selector may be further configured to determine whether to display a list of recommended cards on a screen of the device based on a display mode of the device, and to select a card to be used in the settlement based on a received user input which relates to the displayed list of recommended cards.

The display mode may include at least one of a horizontal view mode and a vertical view mode.

The card information provider may be further configured to provide the settlement information to the POS terminal via near field communication (NFC).

According to another aspect of one or more exemplary embodiments, there is provided a method for using a first device in conjunction with a performance of an interaction between a first user and a second user, the first device including a user graphical interface for providing an input/output capability with respect to the first user, and the method including: accessing information which relates to each of a plurality of items which are associated with the first user, the information including first item information which at least relates to a use history of a first item and second item information which at least relates to a use history of a second item; acquiring environmental information which relates to an environment in which the interaction is to be performed; using the first device to select, from among the plurality of items, an item for use in conjunction with the performance of the interaction, based on the accessed information and the acquired environmental information, and to generate information which relates to the performance of the interaction based on a result of the selection; transmitting, to a second device which is associated with the second user, the generated information which relates to the performance of the interaction; and displaying, via the graphical user interface and on a screen of the first device, at least a part of the generated information which relates to the performance of the interaction.

The first item information may include a plurality of first item information characteristics, the second item information may include a plurality of second item information characteristics, and the environmental information may include a plurality of environmental information characteristics. The using the device to select a card may include assigning respective priority values to each of the plurality of items for each of the plurality of environmental information characteristics and assigning respective weights to each of the first item information characteristics, each of the second item information characteristics, and each of the environmental information characteristics.

The first item information may further relate to at least one perquisite which accrues to the first user in conjunction with using the first item, and the second item information may further relate to at least one perquisite which accrues to the first user in conjunction with using the second item.

The method may further include prompting the first user to provide input via the graphical user interface of the first device with respect to the plurality of items. The using the first device to select an item may be further based on a received user input which is received as a result of the prompting.

The prompting may include displaying, via the graphical user interface and on the screen of the device, item-specific information which relates to at least one of the plurality of items.

The prompting may include displaying, via the user interface and on the screen of the device, a plurality of images, each of which respectively corresponds to a respective one of the plurality of items, and providing, on the display of the device, an indication which relates to a recommendation which is based on the accessed information and the acquired environmental information.

The method may further include using the first device to receive authentication information which relates to the first user with respect to the selected item, and using the received authentication information to determine whether the interaction is safely performable.

The acquiring the environmental information may include acquiring information which relates to a location of the first device, and the using the first device to select the item may include using the first device to select the item based on the acquired environmental information which relates to the location of the first device.

The environmental information may include at least one of a current date, a current time, an expiration date which relates to the interaction, an identification value which relates to the interaction, identifying information which relates to the second user, and identifying information which relates to the second device.

The method may further include determining a display mode of the first device. The using the first device to select the item may include determining whether to display a list of recommended items via the user interface on the screen of the first device based on the determined display mode and selecting an item to be used in the interaction based on a received user input which relates to the displayed list of recommended items.

The display mode may include at least one of a horizontal view mode and a vertical view mode.

The acquiring the environmental information may include receiving the environmental information from the second device via near field communication (NFC), and the transmitting the generated information which relates to the interaction may include transmitting the generated information to the second device via NFC.

According to another aspect of one or more exemplary embodiments, there is provided a first device for use in conjunction with a performance of an interaction between a first user and a second user. The first device includes: a memory which is configured to store item-related information which relates to each of a plurality of items which are associated with the first user, the information including first item information which at least relates to a use history of a first item and second item information which at least relates to a use history of a second item; a transceiver which is configured to receive environmental information which relates to an environment in which the interaction is to be performed; and a processor which is configured to select, from among the plurality of items, an item for use in conjunction with the performance of the interaction, based on the stored item-related information and the received environmental information, and to generate information which relates to the performance of the interaction based on a result of the selection. The transceiver is further configured to transmit, to a second device which is associated with the second user, the generated information which relates to the performance of the interaction.

The first item information may include a plurality of first item information characteristics, the second item information may include a plurality of second item information characteristics, and the environmental information may include a plurality of environmental information characteristics. The processor may be further configured to assign respective priority values to each of the plurality of items for each of the plurality of environmental information characteristics and to assign respective weights to each of the first item information characteristics, each of the second item information characteristics, and each of the environmental information characteristics.

The first item information may further relate to at least one perquisite which accrues to the first user in conjunction with using the first item and the second item information may further relate to at least one perquisite which accrues to the first user in conjunction with using the second item.

The processor may be further configured to cause a display of the first device to display prompting information which relates to prompting the first user to provide input with respect to the plurality of items, and to select the item from among the plurality of items based on the stored item-related information, the received environmental information, and a received user input which is received in response to the displayed prompting information.

The processor may be further configured to cause the display to display item-specific information which relates to at least one of the plurality of items.

The processor may be further configured to cause the display to display a plurality of images, each of which respectively corresponds to a respective one of the plurality of items, and to display an indication which relates to a recommendation which is based on the stored information and the received environmental information.

The transceiver may be further configured to receive authentication information which relates to the first user with respect to the selected item. The processor may be further configured to use the received authentication information to determine whether the interaction is safely performable.

The transceiver may be further configured to receive information which relates to a location of the first device. The processor may be further configured to select the item based on the received information which relates to the location of the first device.

The environmental information may include at least one of a current date, a current time, an expiration date which relates to the interaction, an identification value which relates to the interaction, identifying information which relates to the second user, and identifying information which relates to the second device.

The processor may be further configured to determine a display mode of the first device, and to determine whether to display a list of recommended items on a display of the first device based on the determined display mode, and to select the item to be used in the interaction based on a received user input which relates to the displayed list of recommended items.

The display mode may include at least one of a horizontal view mode and a vertical view mode.

The transceiver may be further configured to receive the environmental information from the second device via near field communication (NFC), and to transmit the generated information which relates to the interaction to the second device via NFC.

According to another aspect of one or more exemplary embodiments, there is provided a non-transitory computer-readable recording medium having recorded thereon a program for executing the method.

BRIEF DESCRIPTION OF THE DRAWINGS

The above and other features and advantages of the present inventive concept will become more apparent by describing in detail exemplary embodiments thereof with reference to the attached drawings in which:

FIG. 4 is a table which shows a priority for each card, which is set by a device in correspondence with items which are included in a settlement history;

FIG. 5 is a table which shows benefit information for each card recommended by a device;

DETAILED DESCRIPTION

Figure 1:
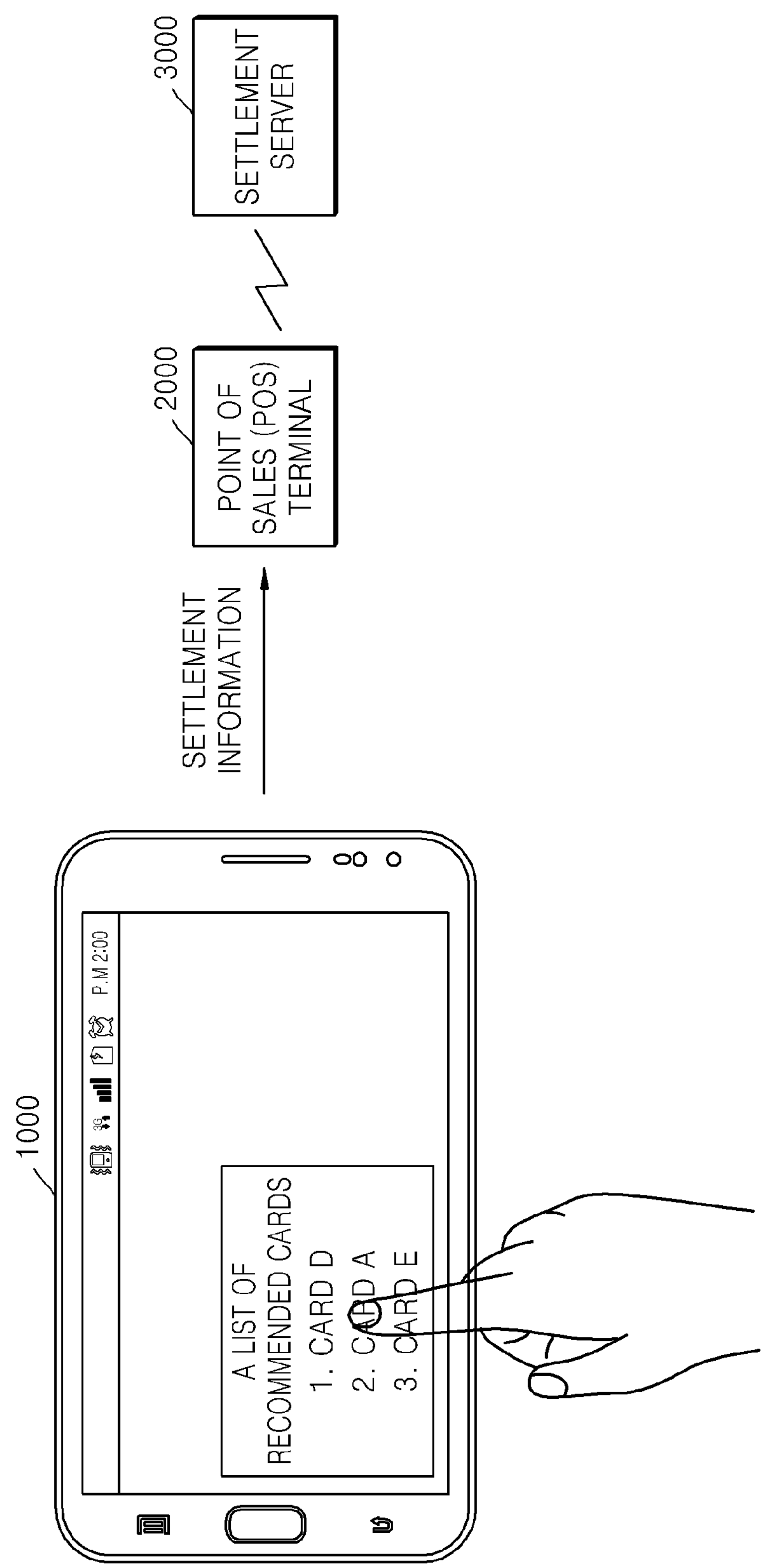
FIG. 1 is a schematic block diagram of a settlement system for performing a settlement for a transaction which involves goods by using a card which is selected based on a settlement environment, according to an exemplary embodiment.

Hereinafter, the present inventive concept will now be described more fully with reference to the accompanying drawings, in which exemplary embodiments are shown. The present inventive concept may, however, be embodied in many different forms and should not be construed as being limited to the exemplary embodiments set forth herein; rather, these exemplary embodiments are provided so that this disclosure will be thorough and complete, and will fully convey the present inventive concept to those of ordinary skill in the art. In the following description, well-known functions or constructions are not described in detail so as not to obscure the present disclosure with unnecessary detail. Also, throughout the specification, like reference numerals in the drawings denote like elements.

Throughout the specification, it will also be understood that when an element is referred to as being "connected to" another element, it can be directly connected to the other element, or electrically connected to the other element while intervening elements may also be present. Also, when a part "includes" or "comprises" an element, unless there is a particular description contrary thereto, the part can further include other elements, not excluding the other elements.

Also, throughout the specification, it will be understood that when an element A and an element B perform short-range communication, this means that the element A is located within a communication range of the element B and/or the element B is located within a communication range of the element A.

Also, a card that is described throughout the specification refers to a card which is usable in relation to a transactional settlement for goods and services, and examples of the card may include a credit card, a mileage card, and a points card. However, the exemplary embodiments are not limited thereto.

Hereinafter, the present inventive concept will be described in detail by explaining exemplary embodiments thereof with reference to the attached drawings. Expressions such as "at least one of," when preceding a list of elements, modify the entire list of elements and do not modify the individual elements of the list.

FIG. 1 is a schematic block diagram of a settlement system for performing a settlement for a transaction which involves goods by using a card which is selected depending on a settlement environment, according to an exemplary embodiment.

Referring to FIG. 1, the settlement system includes a device 1000, a point of sale (POS) terminal 2000, and a settlement server 3000.

The device 1000 is used to select a suitable card based on a settlement environment, and provides card information which relates to the selected card to the POS terminal 2000. The POS terminal 2000 provides received settlement information to the settlement server 3000, and may cause the settlement server 3000 to perform the settlement by using the device 1000.

The device 1000 may store card information which relates to a user's card and card benefit information which relates to benefits of the user's card. Also, the device 1000 may store a card settlement history of a user with respect to time, place, and a purpose of a settlement. The device 1000 may provide a recommendation which relates to a card based on a settlement environment of the device 1000, based on the stored card information and card settlement history. Also, the device 1000 may determine whether to automatically select a card to be used in a settlement or to select a card to be used in a settlement based on a received user input, based on a display mode.

The device 1000 may be any one or more of a smartphone, a mobile phone, a personal digital assistant (PDA), a laptop computer, a media player, a global positioning system (GPS) apparatus, and/or any other mobile or non-mobile computing devices. However, the device 1000 is not limited thereto.

In another exemplary embodiment, the block diagram of FIG. 1 can be understood as representing a system for performing an interaction between a first user and a second user. The device 1000 can be understood as being associated with the first user, and the device 2000 can be understood as being associated with the second user. Although the above-described exemplary embodiment refers to the interaction as being a settlement, other interactions may be performed.

For example, a traveler may be preparing to fly on an airplane and may need to check in to obtain a boarding pass and/or to check baggage. In such a scenario, the traveler may be understood as being a first user, and the airline company may be understood as being the second user. The second device 2000 may be, for example, a kiosk at the airport, or a computer which is linked to the airline's web site on the Internet. The traveler may have a mobile phone which acts as a first device 1000, and the mobile phone may display images which correspond to items, such as, for example, a passport, a driver's license, and a personal credit card, which can be used for the purpose of checking in for the flight and/or checking baggage.

As another example, a social media user may be preparing to upload information which relates to a recent experience. In this scenario, the social media user may be understood as being a first user, and the second user may be the social media web site. The second device may be, for example, any terminal which may be used to access the social media web site. The social media user may have a mobile phone which acts as a first device 1000, and the mobile phone may display images which correspond to items, such as, for example, photographs, text messages, and uniform resource locator (URL) links, which can be selectable for the purpose of uploading information to the social media site.

Figure 2:
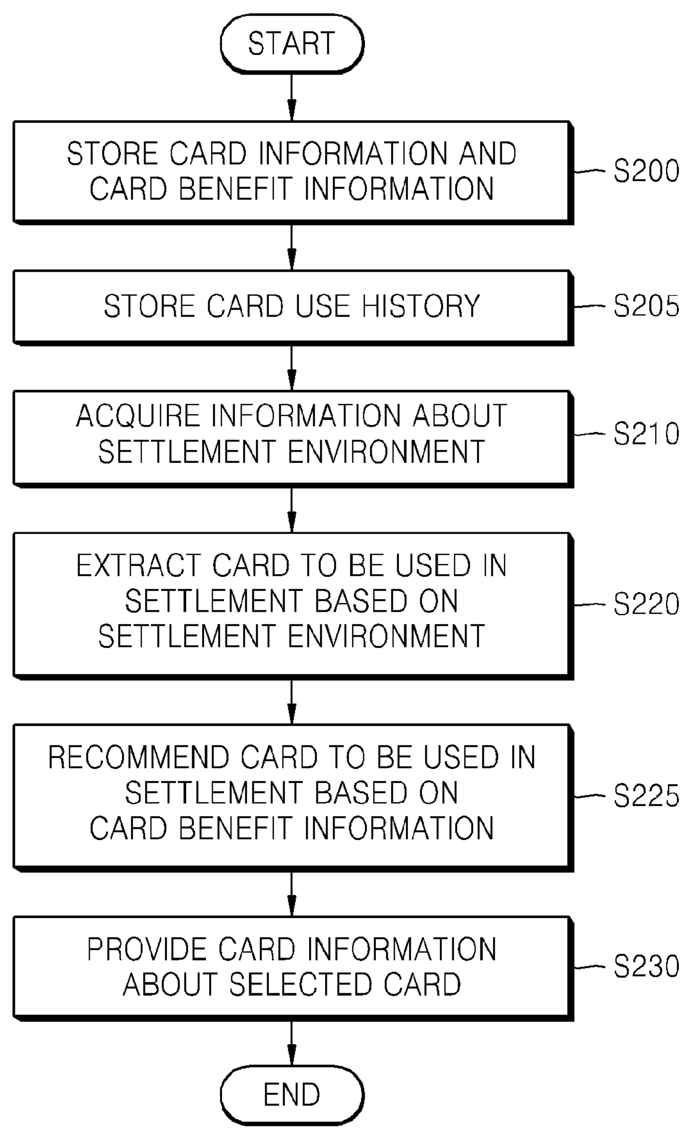
FIG. 2 is a flowchart which illustrates a method by which a device is used to select a card for a settlement based on a settlement environment and by which the device is used to provide card information which relates to the selected card, according to an exemplary embodiment.

FIG. 2 is a flowchart which illustrates a method by which the device 1000 is used to select a card for a settlement based on a settlement environment and by which the device 1000 is used to provide card information which relates to the selected card, according to an exemplary embodiment.

In operation S200, the device 1000 stores card information and card benefit information. The device 1000 may store card information which relates to a user's card based on input which is received from the user. The card information may include, for example, information which relates to any one or more of the type of a card, a card number, and the expiration date of a card. Also, the device 1000 may receive card information from the settlement server 3000, and may store the received card information. The settlement server 3000 may be a server that is operated by a credit card company, but the present exemplary embodiment is not limited thereto. In this case, the device 1000 may provide user profile information stored in the device 1000 to the settlement server 3000, and may receive card information corresponding to the provided user profile information from the settlement server 3000. In addition, if a user has a newly issued card, the device 1000 may receive card information which relates to the newly issued card.

Further, the device 1000 may store card benefit information for each card stored in the device 1000 based on a received user input. The device 1000 may provide a user interface for facilitating input of card benefit information, and a user may input card benefit information for each card stored in the device 1000 via the user interface. The device 1000 may receive card benefit information from the settlement server 3000, and may store the received card benefit information. The card benefit information may be stored after being matched to each card. The card benefit information may include, for example, discount information, points accumulation information, and coupon information. Further, the card benefit information may include information which relates to different benefits from member stores where a card is used.

In operation S205, the device 1000 stores a card use history which relates to a user. The card use history may include, for example, any one or more of a card number used in a settlement, a settlement time, a settlement date, a member store's name, a settlement location, a name of goods, and information which relates to a benefit provided at the time of a card settlement. When a user conducts a settlement by using a card via the device 1000, the device 1000 may store a use history of a card used in the settlement. However, the present exemplary embodiment is not limited thereto. Information which relates to a card use history, which is received via the device 1000, may be stored and accumulated in the settlement server 3000, and the device 1000 may receive the information which relates to the card use history that is stored in the settlement server 3000 from the settlement server 3000.

In operation S210, the device 1000 acquires information which relates to a settlement environment. When a user attempts a card settlement via the device 1000, the device 1000 may acquire the information which relates to a settlement environment. The device 1000 may acquire the information which relates to a settlement environment from at least one of a sensor in the device 1000, the POS terminal 2000, and the settlement server 3000. The information which relates to a settlement environment may include, for example, any one or more of a settlement time, a settlement location, a member store's name, and information which relates to goods.

In detail, the device 1000 may acquire information which relates to a location of the device 1000, and may identify a member store to be used for performing a settlement based on the acquired location information. For example, the device 1000 may determine a GPS value for a location of the device 1000 by using a GPS sensor (not shown). Further, the device 1000 may determine an identification value of an access point (AP) that is connected to the device 1000. Furthermore, the device 1000 may identify a member store in which the device 1000 is located, based on at least one of the GPS value and the identification value of the AP. In this case, information which relates to a member store corresponding to the GPS value and the identification value of the AP may be stored in the device 1000 or a separate server (not shown) in advance.

The device 1000 may determine information which relates to goods which may be involved in a settlement. The device 1000 may determine the information which relates to the goods via a marker attached on the goods. However, the present exemplary embodiment is not limited thereto. The device 1000 may also determine the information which relates to the goods from the POS terminal 2000. The device 1000 may receive at least one of a current date, a current time, an expiration date of the goods, an identification value of the goods, a cost of the goods, and an identification value of a member store which corresponds to the POS terminal 2000. However, the present exemplary embodiment is not limited thereto.

The device 1000 may determine any one or more of a points accumulation rate for each card, a points accumulation limit for each card, a discount rate for each card, and a discount limit for each card, based on information which relates to a member store and to goods. Information which relates to the points accumulation rate, the points accumulation limit, the discount rate, and the discount limit, according to a member store and goods, may be stored in the device 1000 or a separate server (not shown) in advance.

In operation S220, the device 1000 selects a card to be used in a settlement based on a settlement environment.

The device 1000 may determine a card to be used in a settlement under an acquired settlement environment by using any one or more of card information, card benefit information, and a settlement history.

In detail, the device 1000 may extract a card used more than a predetermined number of times within an acquired settlement environment, based on a card settlement history. For example, if a card 'A', a card 'B', a card 'C', and a card 'D' are usable in a member store 'Z' and a member store in an acquired settlement environment is 'Z', the device 1000 may extract the card 'A', the card 'B', the card 'C', and the card 'D' from card information. If the card 'C' and the card 'A' have been used more than a predetermined number of times in the member store 'Z' and a member store in an acquired settlement environment is 'Z', the device 1000 may extract the card 'C' and the card 'A' from the card information.

In addition, if the card 'A', the card 'B', the card 'C', and the card 'D' have been used between 11:00 and 14:00 and a settlement time included in an acquired settlement environment is between 11:00 and 14:00, the device 1000 may extract the card 'A', the card 'B', the card 'C', and the card 'D' from the card information. For example, if priorities of the card 'A' and the card 'B' of the cards used between 11:00 and 14:00 are relatively high and a member store in an acquired settlement environment is 'Z', the device 1000 may extract the card 'A' and the card 'B' from the card information. In this case, priorities of cards may be determined based on a predetermined criterion, or may be determined based on a received user input. In addition, a benefit for each card may be reflected to determine the priorities of cards. However, the present exemplary embodiment is not limited thereto.

The device 1000 may also extract a card based on one or more of a plurality of items included in a settlement history and a settlement environment. In this case, the device 1000 may apply a predetermined weight to each of the plurality of items included in the settlement history and the settlement environment, and may determine a card to extract in the acquired settlement environment based on the weights of the plurality of items.

In operation S225, the device 1000 recommends a card to be used in a settlement based on the card benefit information. The device 1000 may compare respective benefits of extracted cards with each other based on the card benefit information, and may provide a recommendation with respect to each of a predetermined number or more cards. For example, the device 1000 may extract all of the cards and compare their respective benefits with each other in order to pick out the one with the best benefits with respect to a particular transaction or settlement. Further, the device 1000 extracts a card and compares its benefits with those of other cards. Further, the device 1000 may determine a card to recommend based on types of card benefits that a user prefers, and/or the amount of monetary benefit. The device 1000 may display information which relates to a benefit, which is provided for each card, on a screen, and may allow a user to select a predetermined card based on the displayed benefit information.

In this case, the device 1000 may receive the card benefit information from the settlement server 3000. The device 1000 may transmit card information stored in the device 1000 to the settlement server 3000 in order to receive the card benefit information from the settlement server 3000. However, the present exemplary embodiment is not limited thereto.

The device 1000 may receive card benefit information from a terminal (not shown) of a member store. In this case, the terminal of the member store may transmit types of cards providing benefits at the member store and information which relates to the benefits to the device 1000 in the member store. The terminal of the member store may provide the benefit information to the device 1000 via at least one of a short message service (SMS) and a multi-mode service (MMS). However, the present exemplary embodiment is not limited thereto. Further, the terminal of the member store may provide the benefit information to the device 1000 via a wireless fidelity (WiFi) network.

Benefit information for each recommended card that is displayed on a screen of the device 1000 is described below with reference to FIG. 5.

The device 1000 may automatically select a card to be used in a settlement based on a display mode, or may select a card to be used in a settlement based on a received user input. A priority set for each card based on items which are included in a settlement history is described in more detail below with reference to FIG. 3.

The device 1000 may display a list of recommended cards to be used in connection with a settlement on an unlock screen of the device 1000. For example, an image of a recommended card may be displayed on an unlock button displayed on the unlock screen of the device 1000. However, the present exemplary embodiment is not limited thereto.

In this case, if a user selects a card image which is displayed on the unlock screen of the device 1000, a user interface which prompts an input of a personal identification number (PIN) for a selected card may be displayed. However, the present exemplary embodiment is not limited thereto. If a user touches a card image which is displayed on the unlock screen of the device 1000, the device 1000 may recognize a fingerprint of a user based on a touch input which is received from the user, and may unlock the device 1000 based on the recognized fingerprint in order to perform a settlement.

In addition, if a user selects a card image which is displayed on the unlock screen of the device 1000, the device 1000 may also authenticate the user based on the user's image and voice. For example, the device 1000 may photograph a user's face, and may determine whether the photographed user is a user of the selected card which is displayed on the unlock screen based on the photograph. In addition, for example, the device may recognize a user's iris in order to authenticate the user. In addition, the device 1000 may record a user's voice in order to authenticate the user based on the recorded voice.

If a user selects a predetermined card from the recommended card list, a settlement window for the selected card may be displayed on the screen of the device 1000. The settlement window which is displayed on the screen of the device 1000 may include, for example, any one or more of card information, coupon information, a settlement amount, and a PIN code input field. In addition, a user may input a PIN code of the selected card to the PIN code input field so that the settlement via the selected card may be authenticated.

If the settlement via the selected card is safely performable, a portion of the settlement window or the whole settlement window may be displayed in a predetermined color. The device 1000 may determine whether settlement information which relates to the selected card may be safely transmitted to the POS terminal 2000 and/or to the settlement server 3000, and may display the settlement window in a color which has previously been set by a user when a determination is made that the settlement information may be safely transmitted. The device 1000 may receive authentication information from the POS terminal 2000 and the settlement server 3000 in order to determine whether the settlement information which relates to the selected card may be safely transmitted to the POS terminal 2000 and the settlement server 3000. However, the present exemplary embodiment is not limited thereto.

In operation S230, the device 1000 provides card information which relates to the selected card. In this case, the device 1000 may provide the card information to the POS terminal 2000 via a local area network (LAN). The device 1000 may provide information which relates to any one or more of a card number, the expiration date of a card, and/or a PIN of a card to the POS terminal 2000. However, the present exemplary embodiment is not limited thereto. In addition, the device 1000 may determine whether a coupon which corresponds to the selected card is stored in the device 1000, and may provide the card information which relates to the selected card and coupon information stored in the device 1000 to the POS terminal 2000. In this case, the POS terminal 2000 may settle an amount reflecting the coupon information via the settlement server 3000 by using the card information and the coupon information. However, the present exemplary embodiment is not limited thereto.

The flowchart of FIG. 2 may be also be applicable to other exemplary embodiments. For example, the flowchart of FIG. 2 may be applicable to the above-described scenario of the traveler checking in for a flight and/or checking baggage for a flight. In operation S200, the traveler's mobile phone stores information relating to each of a passport, a driver's license, and a credit card, and in operation S205, the traveler's mobile phone stores use history information with respect to each of these items. In operation S210, the traveler uses the mobile phone to acquire information which relates to the flight check-in and the baggage check. In operation S220, the mobile phone selects an item to be used for performing the check-in and/or the baggage check, and in operation S225, the mobile phone displays a recommendation on the screen to the traveler regarding the item to be used. In operation S230, the mobile phone transmits the relevant information regarding the selected item to the device 2000 which is used by the airline for completing the check-in and baggage check processes, e.g., a kiosk or a link to the airline's web site.

Similarly, the flowchart of FIG. 2 can be applied to the above-described scenario of the social media user uploading information which relates to a recent experience. In operation S200, the social media user's mobile phone stores information relating to each of photographs, text messages, and URLs, and in operation S205, the social media user's mobile phone stores use history information with respect to each of these items. In operation S210, the social media user uses the mobile phone to acquire information which relates to the upload, such as, for example, a throughput rate of an available wireless connection by which the upload may occur. In operation S220, the mobile phone selects an item to be used in conjunction with performing the upload, and in operation S225, the mobile phone displays a recommendation on the screen to the social media user regarding the item to be used. In operation S230, the mobile phone transmits the relevant information regarding the selected item to the device 2000 which is used for performing the upload, e.g., a computer terminal or a Wi-Fi connection at a hotspot.

Figure 3:
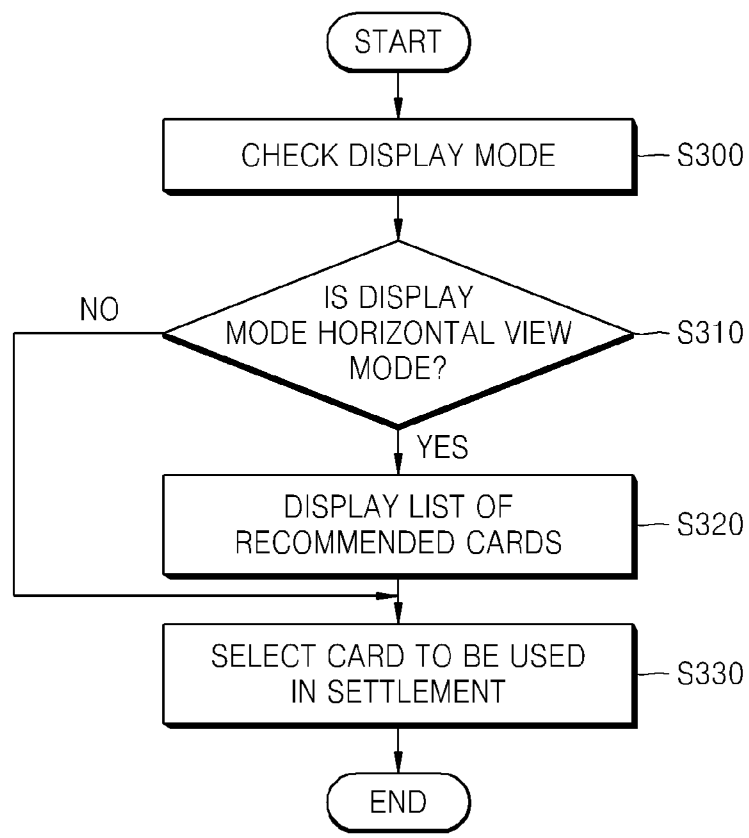
FIG. 3 is a flowchart which illustrates a method by which a device displays a recommended card list and selects a card to be used in a settlement according to a received user input, according to an exemplary embodiment.

FIG. 3 is a flowchart which illustrates a method by which the device 1000 displays a recommended card list and selects a card to be used in a settlement based on a received user input, according to an exemplary embodiment.

In operation S300, the device 1000 checks a display mode. The display mode may include at least one of a horizontal view mode and a vertical view mode. However, the present exemplary embodiment is not limited thereto.

In operation S310, the device 1000 determines whether the display mode is the horizontal view mode or the vertical view mode. The device 1000 may determine whether the display mode is the horizontal view mode or the vertical view mode by using a gravity sensor in the device 1000.

If a determination is made in operation S310 that the display mode of the device 1000 is the horizontal view mode, then in operation S320, the device 1000 displays a list of recommended cards. In operation S320, the device 1000 may recommend a card to be used in a settlement in an acquired settlement environment by using any one or more of card information, card benefit information, and a settlement history. For example, if transportation expenses are settled between 11:00 and 14:00, the device 1000 may recommend the card 'A' and the card 'D', and may display a list which includes the recommend cards 'A' and 'D' on a screen of the device 1000.

In operation S330, the device 1000 selects a card to be used in a settlement based on a received user input. In operation S330, the device 1000 may select a card to be used in a settlement, based on a received user input which relates to and/or is responsive to the list of recommended cards.

Otherwise, if a determination is made in operation S310 that the display mode of the device 1000 is the vertical view mode, then in operation S330, the device 1000 may automatically select a card to be used in a settlement without receiving input from the user.

FIG. 4 is a table which shows a priority for each card, which is set by the device 1000 based on items which are included in a settlement history. The priority which is set in the table of FIG. 4 may be used when the device 1000 extracts a card based on a settlement environment from card information. However, the present exemplary embodiment is not limited thereto.

As illustrated in FIG. 4, the table may include a time field 40, a location field 42, a cost field 44, a points limit field 46, and a settlement purpose field 48. A settlement time and a priority value of each card with respect to the settlement time may be recorded in the time field 40. For example, if the settlement time is between 11:00 and 14:00, priority values '1', '2', '3', and '4', which correspond to the cards 'A', 'B', 'C', and 'D', respectively, may be recorded in the time field 40.

Values for a location of the device 1000 are recorded in the location field 42. A name of a member store and a priority value of each card corresponding to the name of the member store may be stored in the location field 42. For example, if the name of the member store is 'member store A', priority values '2', '4', '1', and '3', which correspond to the cards 'A', 'E', 'C', and 'D', respectively, may be recorded in the location field 42.

A settlement amount and a priority value of each card for the settlement amount may be recorded in the cost field 44. For example, if the settlement amount corresponds to "30,000 won or less," priority values '2', '1', '3', and '4', which correspond to the cards 'A', 'B', 'C', and 'D', respectively, may be recorded in the cost field 44.

A points limit amount and a priority value of each card for the points limit amount may be recorded in the points limit field 46. For example, if the points limit amount is 30,000 won per month, priority values '3', '2', '1', and '4', which correspond to the cards 'A', 'B', 'C', and 'D', respectively, may be recorded in the cost field 44.

A purpose of each card and a priority value of each card for the purpose may be recorded in the settlement purpose field 48. For example, if the settlement purpose relates to transportation expenses, priority values '2', '3', '4', and '1', which correspond to the cards 'A', 'B', 'C', and 'D', respectively, may be recorded in the settlement purpose field 48.

Weight values '10', '10', '20', '40', and '60' may be recorded in the time field 40, the location field 42, the cost field 44, the points limit field 46, and the settlement purpose field 48, respectively. For example, if an amount of '30,000 won or less' is settled between 11:00 and 14:00, the priority values of the cards 'A', 'B', 'C', and 'D' may be determined based on a weight value '10' for the time and a weight value '20' for the amount.

FIG. 5 is a table which shows benefit information for each card recommended by the device 1000.

Referring to the table of FIG. 5, benefit information for each card recommended by the device 1000 may be displayed. For example, when the device 1000 performs a settlement for goods 'Y' at a member store 'Z', the device 1000 may recommend the card 'A', the card 'B', and the card 'C' based on a settlement environment, and may display a list of recommended cards on a screen of the device 1000. In addition, the device 1000 may display information which relates to a benefit that is provided by each card when conducting a settlement which involves the goods 'Y' at the member store 'Z'. The information which relates to a benefit may include, for example, at least one of discount information, points accumulation information, and coupon information.

Figure 6:
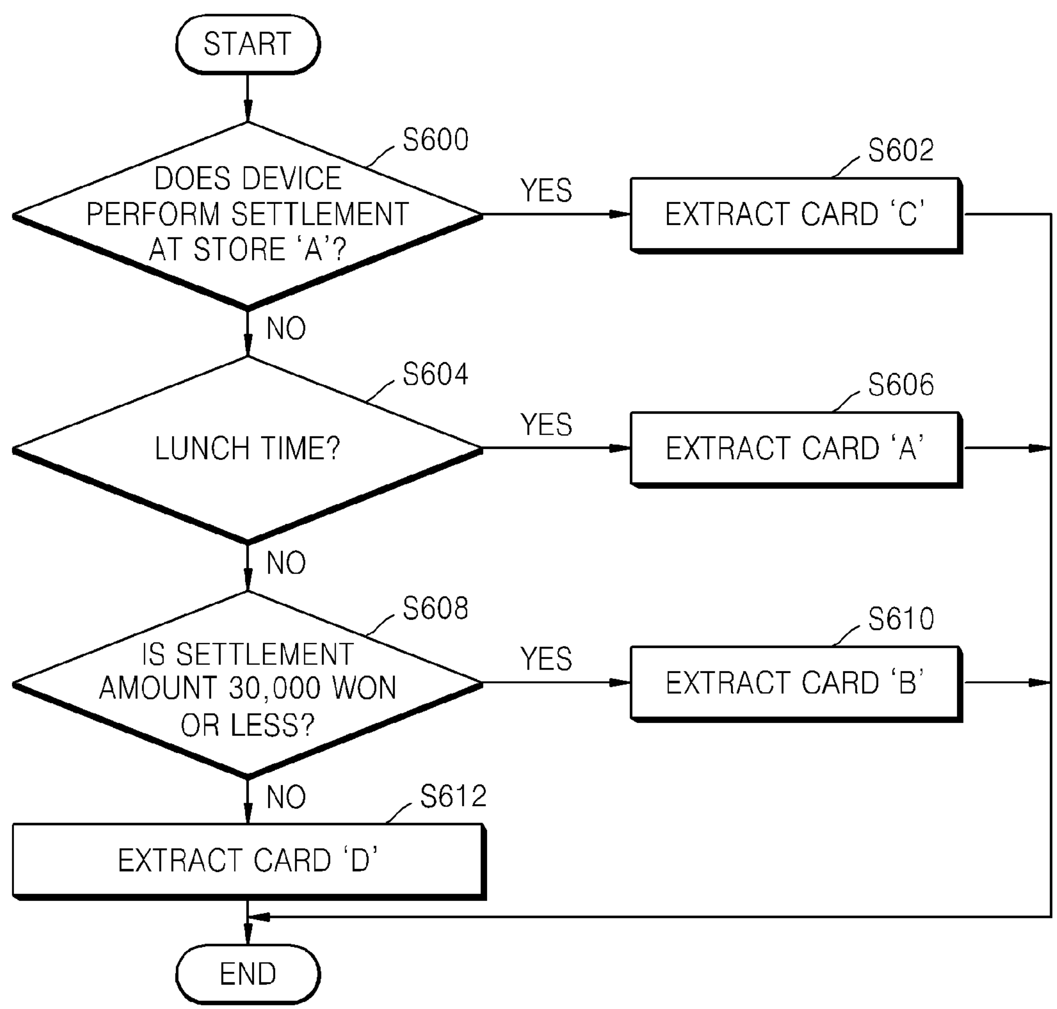
FIG. 6 is a flowchart which illustrates a method by which a device extracts a card based on a priority of a settlement environment, according to an exemplary embodiment.

FIG. 6 is a flowchart which illustrates a method by which the device 1000 extracts a card based on a priority of a settlement environment, according to an exemplary embodiment. In FIG. 6, the device 1000 extracts a card based on the table of FIG. 4. However, the present exemplary embodiment is not limited thereto.

In operation S600, the device 1000 determines whether the device 1000 performs a settlement at a member store 'A'. If, in operation S600, a determination is made that the device 1000 performs a settlement at the member store 'A', then in operation S602, the device 1000 extracts the card 'C' from card information. Otherwise, if, in operation S600, a determination is made that the device 1000 does not perform a settlement at the member store 'A', then in operation S604, the device 1000 determines whether a settlement is to be performed at lunch time.

If, in operation S604, a determination is made that the settlement is to be performed at lunch time, then in operation S606, the device 1000 extracts the card 'A'. Otherwise, if, in operation S604, a determination is made that the settlement is not to be performed at lunch time, then in operation S608, the device 1000 determines whether a settlement amount is 30,000 won or less.

If, in operation S608, a determination is made that the settlement amount is 30,000 won or less, then in operation S610, the device 1000 extracts the card 'B'. Otherwise, if, in operation S608, a determination is made that the settlement amount is not 30,000 won or less, then in operation S612, the device 1000 extracts the card 'D'.

Figure 7:
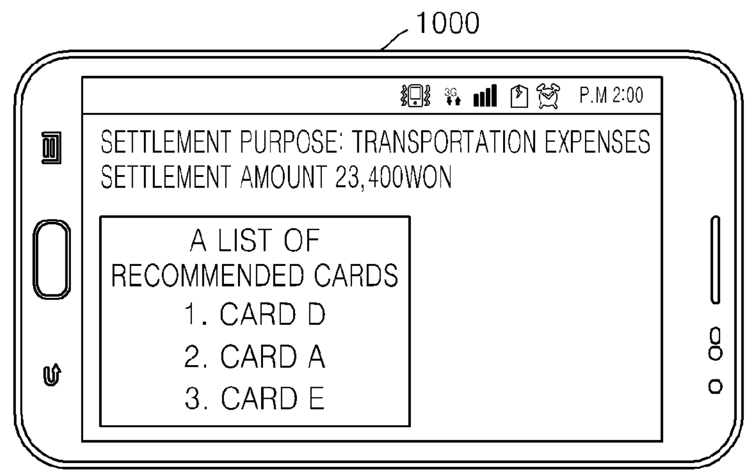
FIG. 7 is a diagram which illustrates an example in which a device displays a list of recommended cards in a horizontal view mode.

FIG. 7 is a diagram which illustrates an example in which the device 1000 displays a list of recommended cards in the horizontal view mode.

As illustrated in FIG. 7, when the display mode of the device 1000 is the horizontal view mode, the list of recommended cards may be displayed on the screen of the device 1000. The device 1000 may determine cards for inclusion in the list according to any one or more of various criteria, based on a combination of at least one of a settlement time, a settlement location, a settlement purpose, a points accumulation rate according to settlement, a points accumulation limit, a discount rate according to settlement, and a discount limit. In this case, the device 1000 may determine cards for inclusion in the list of recommended cards by using values which are recorded in either or both of the tables of FIGS. 4 and 5. In addition, the device 1000 may display a list of the determined cards on the screen of the device 1000.

For example, in the case where the settlement time is 13:00, the settlement purpose is transportation expenses, and a settlement amount is 23,400 won, if the display mode of the device 1000 is the horizontal view mode, the device 1000 may display a list of recommended cards in the order of the card 'D', the card 'A', and the card 'E', as shown in FIG. 7. Further, the device 1000 may select the card 'A' based on a received user input for the card 'A' which is included in the list of the recommended cards, and may provide card information which relates to the selected card 'A' to the POS terminal 2000.

If the display mode of the device 1000 is the vertical view mode, the device 1000 may automatically select the card 'D' without displaying a list of recommended cards, and may transmit card information which relates to the selected card 'D' to the POS terminal 2000.

Figure 8:
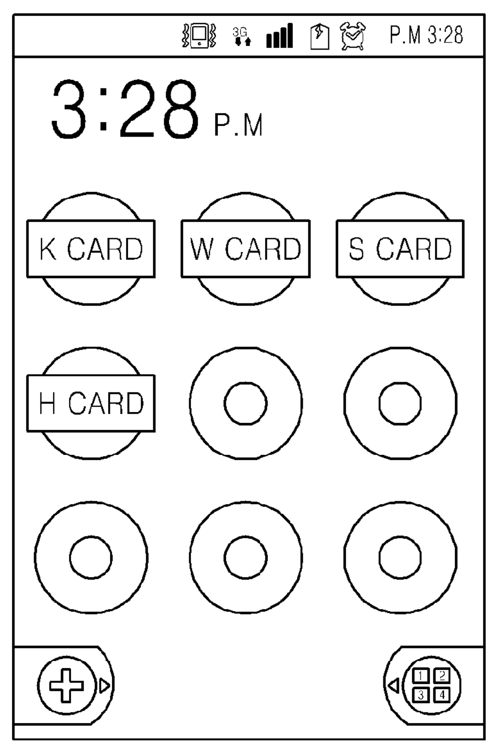
FIG. 8 is a diagram which illustrates an example in which card images are displayed on an unlock screen of a device.

FIG. 8 is a diagram which illustrates an example in which card images are displayed on an unlock screen of the device 1000.

Referring to FIG. 8, unlock buttons may be displayed on the unlock screen of the device 1000, and predetermined card images may be displayed so as to overlap with the displays of some of the unlock buttons, respectively. In this case, the card images that are displayed on the unlock buttons may be images of cards that may be used for a settlement via the device 1000. The card images may be arranged according to a previously set basis, based on information which relates to any one or more of the types of the cards, the points accumulation rates of the cards, and the discount rates of the cards.

Figure 9:
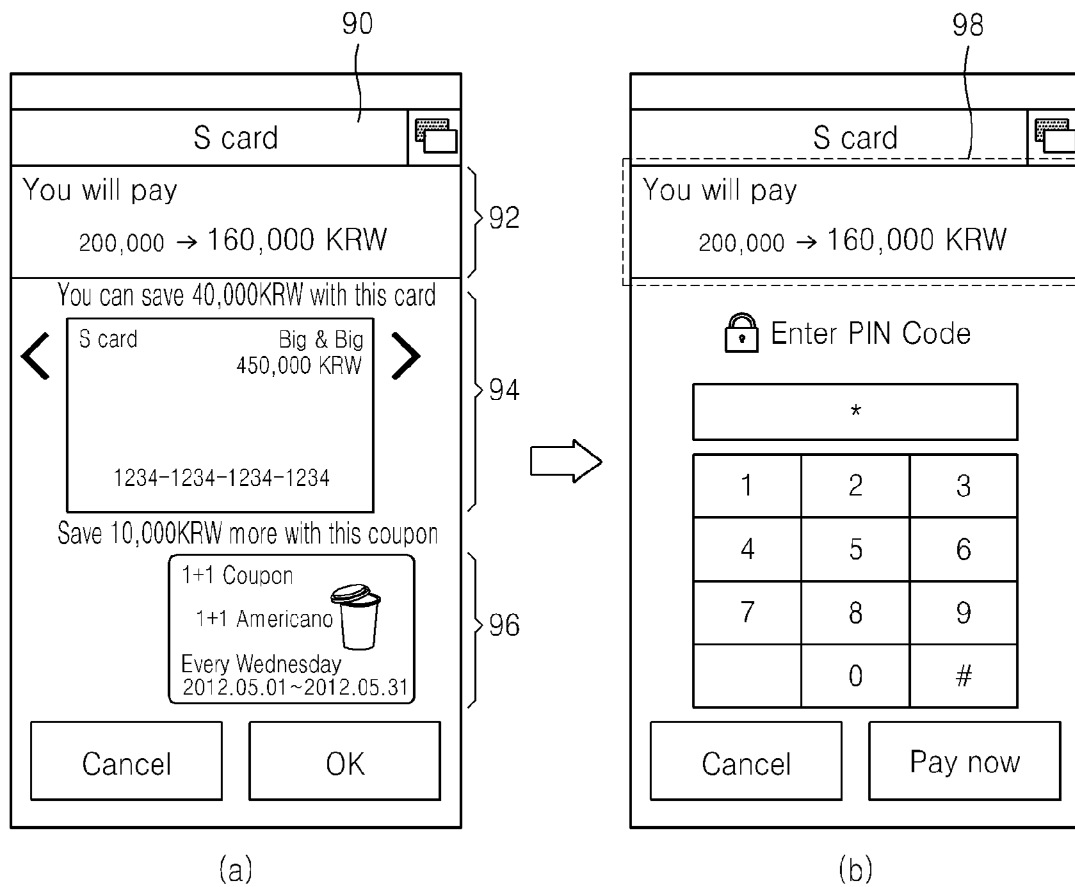
FIG. 9 shows diagrams which illustrate respective examples of a settlement window which is displayed on a screen of a device.

FIG. 9 shows diagrams which illustrate respective examples of a settlement window which is displayed on the screen of the device 1000.

When a predetermined card is selected from a list of recommended cards that is displayed on the screen of the device 1000, the settlement window may be displayed on the screen of the device 1000, as shown in drawing (a) on the left side of FIG. 9. A card name 90, a settlement amount 92, card information 94, and benefit information 96 are included in the settlement window of drawing (a) on the left side of FIG. 9. The settlement amount 92 may include a payment amount for goods and a discount which applies to the purchase of the goods. The benefit information 96 may include, for example, information which relates to coupons.

When a card settlement is selected in the settlement window of drawing (a) in FIG. 9, a settlement window which prompts a user input of a PIN code of a selected card may be displayed, as shown in drawing (b) on the right side of FIG. 9. A user may input the PIN code via the settlement window of drawing (b) of FIG. 9 so that settlement via the selected card may be authenticated.

The device 1000 may determine whether settlement information which relates to the selected card may be safely transmitted to the POS terminal 2000 and the settlement server 3000, and may display a portion 98 of the settlement window of drawing (b) of FIG. 9 in a color which has previously been set by a user when a determination is made that the settlement information may be safely transmitted. In this case, the portion 98 of the settlement window of drawing (b) of FIG. 9 may be displayed in a combination of a plurality of colors. However, the present exemplary embodiment is not limited thereto. The portion 98 of the settlement window of drawing (b) of FIG. 9 may be displayed so as to include a previously set pattern.

Figure 10:
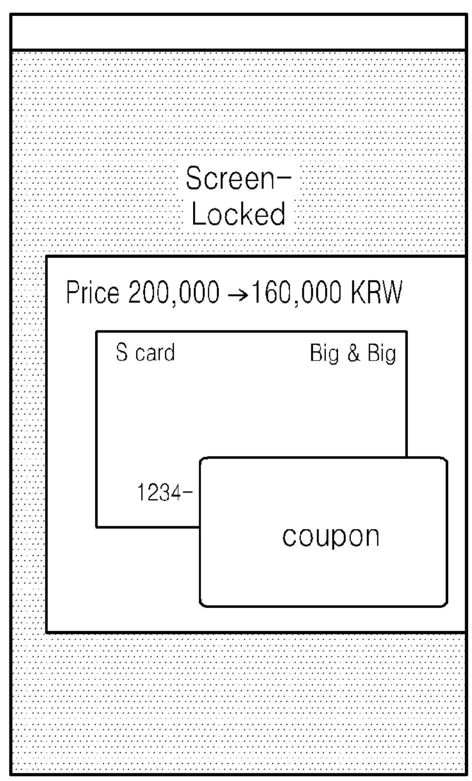
FIG. 10 is a diagram which illustrates an example in which card information is displayed on an unlock screen of a device.

FIG. 10 is a diagram which illustrates an example in which card information is displayed on an unlock screen of the device 1000.

Referring to FIG. 10, a card name, a settlement amount, card information, and benefit information which relates to a recommended card may be displayed on the unlock screen of the device 1000. In this case, a user interface (UI) which may be used for unlocking the screen may not be displayed.

When the device 1000 approaches the POS terminal 2000 within a range in a locked state of the screen of the device 1000, the device 1000 may display card information which relates to a recommended card on the unlock screen of the device 1000. When a user selects the recommended card which is displayed on the unlock screen of the device 1000, the device 1000 may immediately perform a settlement process by using the recommended card.

Figure 11:
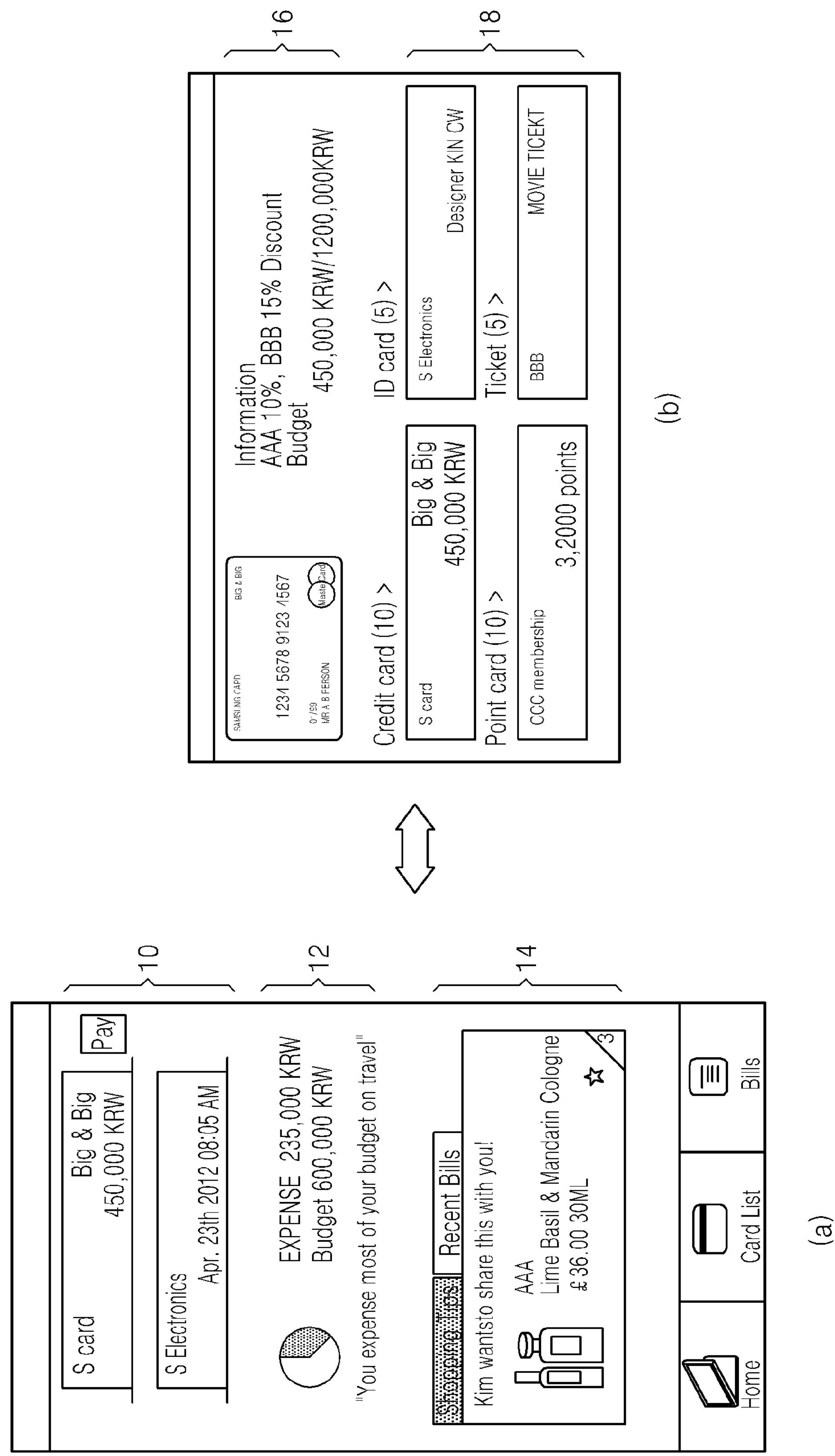
FIG. 11 shows diagrams which illustrate respective examples in which card information is displayed in detail on the screen of a device, based on a display mode thereof.

FIG. 11 shows diagrams which illustrate respective examples in which card information is displayed in detail on the screen of the device 1000 based on the display mode thereof.

Referring to drawing (a) on the left side of FIG. 11, when the display mode of the device 1000 is the vertical view mode, a list 10 of cards that may be used in conjunction with the device 1000, information 12 which relates to a user's financial standing, and information 14 which relates to goods that may be involved in a settlement which is performed by using the device 1000 may be displayed on the screen of the device 1000. Some of the cards stored in the device 1000 may be arranged in the list 10 of cards that may be used in conjunction with the device 1000, and the information 12 which relates to a user's financial standing may be displayed in detail with a graph or other pictorial type of display. The information 14 which relates to goods that may be involved in a settlement which is performed by using the device 1000 may include detailed information which relates to goods which are recommended by another user.

Referring to drawing (b) on the right side of FIG. 11, when the display mode of the device 1000 is the horizontal view mode, information 16 which relates to coupons and a user's financial standing and a list 18 of cards that may be used in conjunction with the device 1000 may be displayed on the screen of the device 1000. The list 18 of cards that may be used in conjunction with the device 1000 may be divided, for example, into a list of credit cards, a list of identification (ID) cards, a list of points cards, and a list of tickets, and the lists acquired by division may be displayed on the screen of the device 1000.

Figure 12:
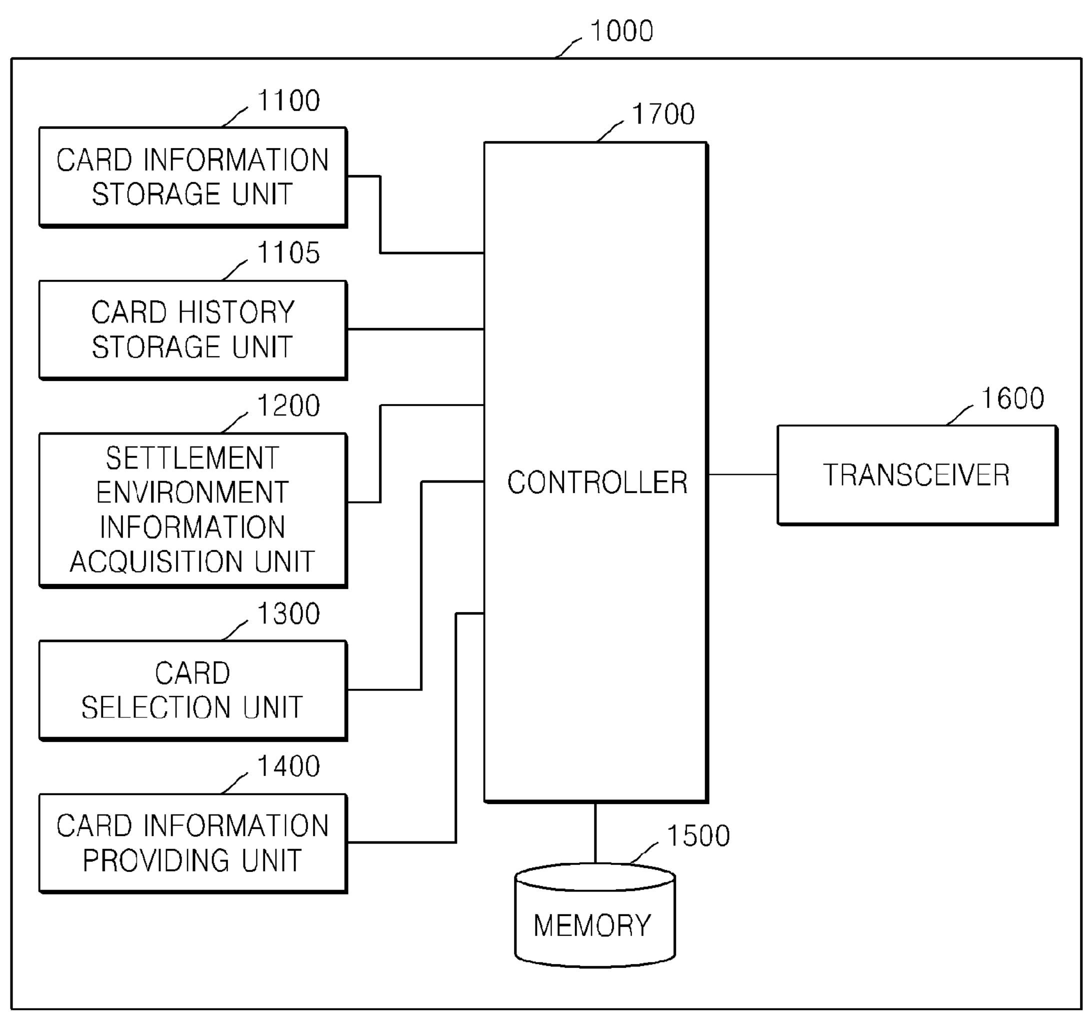
FIG. 12 is a block diagram of a device, according to an exemplary embodiment.

FIG. 12 is a block diagram of the device 1000, according to an exemplary embodiment.

Referring to FIG. 12, the device 1000 includes a card information storage unit 1100 (also referred to herein as a card information storage), a card history storage unit 1105 (also referred to herein as a card history storage), a settlement environment information acquisition unit 1200 (also referred to herein as a settlement environment information acquirer), a card selection unit 1300 (also referred to herein as a card selector), a card information providing unit 1400 (also referred to herein as a card information provider), a memory 1500, a transceiver 1600, and a controller 1700. Each of the card information storage unit 1100, the card history storage unit 1105, the settlement environment information acquisition unit 1200, the card selection unit 1300, and the card information providing unit 1400 may be embodied, for example, as a hardware component of the device 1000, or as a software module which is stored in the device 1000.

The card information storage unit 1100 stores card information and card benefit information. The card information storage unit 1100 may store information which relates to cards that a user has, based on a received user input. The card information may include information which relates to any one or more of the types of the cards, the numbers of the cards, and the expiration dates of the cards. Further, the card information storage unit 1100 may receive the card information from the settlement server 3000, and may store the received card information. The settlement server 3000 may be a server that is operated by a credit card company, but the present exemplary embodiment is not limited thereto. In this case, the card information storage unit 1100 may provide user profile information which is stored in the device 1000 to the settlement server 3000, and may receive card information corresponding to the provided user profile information from the settlement server 3000. In addition, if a user has a newly issued card, the device 1000 may receive card information which relates to the newly issued card.

Further, the card information storage unit 1100 may store card benefit information for each card stored in the device 1000 based on a received user input. The card information storage unit 1100 may provide a user interface which facilitates user input of card benefit information, and a user may input card benefit information for each card stored in the device 1000 via the user interface. The card information storage unit 1100 may receive card benefit information from the settlement server 3000, and may store the received card benefit information. The card benefit information may be stored after being matched to each card, and may include, for example, any one or more of discount information, points accumulation information, and coupon information. In addition, the card benefit information may include information which relates to different benefits from member stores where a card is used.

The card history storage unit 1105 stores a card use history of a user. The card use history may include, for example, any one or more of a card number used in a settlement, a settlement time, a settlement date, a member store's name, a settlement location, a name of goods, and information which relates to a benefit provided at the time of a card settlement. When a user settles up with a card via the device 1000, the card history storage unit 1105 may store a use history of a card used in a settlement. However, the present exemplary embodiment is not limited thereto. Information which relates to a card use history, which is received via the device 1000, may be stored and accumulated in the settlement server 3000, and the card history storage unit 1105 may receive the information which relates to the card use history that is stored in the settlement server 3000 from the settlement server 3000.

The settlement environment information acquisition unit 1200 acquires information which relates to a settlement environment. When a user tries to perform a card settlement by using the device 1000, the settlement environment information acquisition unit 1200 may acquire the information which relates to a settlement environment. The settlement environment information acquisition unit 1200 may acquire the information which relates to a settlement environment from at least one of a sensor in the device 1000, the POS terminal 2000, and the settlement server 3000. The information which relates to a settlement environment may include any one or more of a settlement time, a settlement location, a member store's name, and information which relates to goods.

In detail, the settlement environment information acquisition unit 1200 may acquire information which relates to a location of the device 1000, and may identify a member store which is suitable for performing a settlement based on the acquired location information. For example, the settlement environment information acquisition unit 1200 may determine a GPS value for a location of the device 1000 by using a GPS sensor (not shown). Further, the settlement environment information acquisition unit 1200 may determine an identification value of an AP which is connected to the device 1000. Furthermore, the settlement environment information acquisition unit 1200 may identify a member store in which the device 1000 is located, based on at least one of the GPS value and the identification value of the AP. In this case, information which relates to a member store corresponding to the GPS value and the identification value of the AP may be stored in the device 1000 or a separate server (not shown) in advance.

The settlement environment information acquisition unit 1200 may determine information which relates to goods which may be involved in a potential settlement. The settlement environment information acquisition unit 1200 may determine the information which relates to the goods via a marker which is attached to the goods. However, the present exemplary embodiment is not limited thereto. The settlement environment information acquisition unit 1200 may also determine the information which relates to the goods from the POS terminal 2000.

The settlement environment information acquisition unit 1200 may determine any one or more of a points accumulation rate for each card, a points accumulation limit for each card, a discount rate for each card, and a discount limit for each card, based on information which relates to a member store and goods. Information which relates to the points accumulation rate, the points accumulation limit, the discount rate, and the discount limit, according to a member store and goods, may be stored in the device 1000 or a separate server (not shown) in advance.

The card selection unit 1300 selects a card to be used in a settlement based on a settlement environment. The card selection unit 1300 may determine a card to be used in a settlement within an acquired settlement environment by using any one or more of card information, card benefit information, and a settlement history.

In detail, the card selection unit 1300 may extract a card which has been used more than a predetermined number of times within an acquired settlement environment, based on a card settlement history. For example, if a card 'A', a card 'B', a card 'C', and a card 'D' are used in a member store 'A' and a member store in an acquired settlement environment is 'A', the card selection unit 1300 may extract the card 'A', the card 'B', the card 'C', and the card 'D' from card information. If the card 'C' and a card 'A' have been used more than a predetermined number of times in the member store 'A' and a member store in an acquired settlement environment is 'A', the card selection unit 1300 may extract the card 'C' and the card 'A' from the card information.

In addition, if the card 'A', the card 'B', the card 'C', and the card 'D' are used between 11:00 and 14:00 and a settlement time included in an acquired settlement environment is between 11:00 and 14:00, the card selection unit 1300 may extract the card 'A', the card 'B', the card 'C', and the card 'D' from the card information. For example, if priorities of the card 'A' and the card 'B' of the cards used between 11:00 and 14:00 are relatively high and a member store in an acquired settlement environment is 'A', the card selection unit 1300 may extract the card 'A' and the card 'B' from the card information. In this case, priorities of cards may be determined based on a predetermined criterion, or may be determined based on a received user input. In addition, a benefit for each card may be reflected to determine the priorities of cards. However, the present exemplary embodiment is not limited thereto.

The card selection unit 1300 may also extract a card based on one or more of a plurality of items which are included in a settlement history and a settlement environment. In this case, the card selection unit 1300 may apply a predetermined weight to each of the plurality of items which are included in the settlement history and the settlement environment, and may determine a card to extract in the acquired settlement environment based on the respective weights of the plurality of items.

The card selection unit 1300 may compare respective benefits for extracted cards with each other based on the card benefit information, and may provide a recommendation which lists a predetermined number or more cards. The card selection unit 1300 may determine a card to be included in the recommendation based on at least one of types of card benefits that a user prefers, or the amount of monetary benefit. The card selection unit 1300 may display information which relates to a benefit, which is provided for each card, on a screen, and may enable a user to select a predetermined card based on the displayed benefit information.

In this case, the card selection unit 1300 may receive the card benefit information from the settlement server 3000. The card selection unit 1300 may transmit card information stored in the device 1000 to the settlement server 3000 in order to receive the card benefit information from the settlement server 3000. However, the present exemplary embodiment is not limited thereto.

The card selection unit 1300 may receive card benefit information from a terminal (not shown) of a member store. In this case, the terminal of the member store may transmit types of cards providing benefits at the member store and information which relates to the benefits to the device 1000 in the member store. The terminal of the member store may provide the benefit information to the device 1000 via at least one of SMS or MMS. However, the present exemplary embodiment is not limited thereto. Further, the terminal of the member store may provide the benefit information to the device 1000 via a WiFi network.

The card selection unit 1300 may automatically select a card to be used in a settlement based on a display mode, or may select the card based on a received user input. For example, when the display mode of the device 1000 is the vertical view mode, the card selection unit 1300 may automatically select a card to be used in a settlement without receiving user input. When the display mode of the device 1000 is the horizontal view mode, the card selection unit 1300 may display a list of recommended cards to be used in a settlement on the screen of the device 1000 and may select a card based on a received user input. However, the present exemplary embodiment is not limited thereto. In particular, the card selection unit 1300 may select a card to be used in a settlement based on a received user input when the display mode of the device 1000 is the vertical view mode, and may select the card without receiving user input when the display mode of the device 1000 is the horizontal view mode.

The device 1000 may display a recommended list of cards to be used in a settlement on an unlock screen of the device 1000. For example, an image of a recommended card may be displayed on an unlock button displayed on the unlock screen of the device 1000. However, the present exemplary embodiment is not limited thereto.

In this case, if a user selects a card image which is displayed on the unlock screen of the device 1000, a user interface which facilitates user input of a PIN for a selected card may be displayed. However, the present exemplary embodiment is not limited thereto. If a user touches a card image displayed on the unlock screen of the device 1000, the device 1000 may recognize a fingerprint of a user based on a touch input of the user, and may unlock the device 1000 based on the recognized fingerprint in order to perform a settlement.

If a user selects a card image which is displayed on the unlock screen of the device 1000, the device 1000 may also authenticate the user based on the user's image and voice. For example, the device 1000 may photograph a user's face, and may determine whether the photographed user is a user of a card which is displayed on the unlock screen of the device 1000 based on the photograph. In addition, for example, the device may recognize a user's iris in order to authenticate the user. In addition, the device 1000 may record a user's voice in order to authenticate the user based on the recorded voice.

If a user selects a predetermined card in the recommended card list, the device 1000 may display a settlement window which corresponds to the selected card on the screen of the device 1000. The settlement window which is displayed on the screen of the device 1000 may include, for example, any one or more of card information, coupon information, a settlement amount, and a PIN code input field. In addition, a user may input a PIN code of the selected card to the PIN code input field so that settlement via the selected card may be authenticated.

If the settlement via the selected card is safely performable, a portion or the whole settlement window may be displayed in a predetermined color. The device 1000 may determine whether settlement information which relates to the selected card may be safely transmitted to the POS terminal 2000 and the settlement server 3000, and may display the settlement window in a color which has previously been set by a user when a determination is made that the settlement information may be safely transmitted. The device 1000 may receive authentication information from the POS terminal 2000 and the settlement server 3000 to determine whether the settlement information which relates to the selected card may be safely transmitted to the POS terminal 2000 and the settlement server 3000. However, the present exemplary embodiment is not limited thereto.

The card information providing unit 1400 provides card information which relates to the selected card. In this case, the card information providing unit 1400 may provide the card information to the POS terminal 2000 through a LAN. The card information providing unit 1400 may provide information which relates to any one or more of a card number, the expiration date of a card, and a PIN of a card to the POS terminal 2000. However, the present exemplary embodiment is not limited thereto.

Further, the card information providing unit 1400 may determine whether a coupon corresponding to the selected card is stored in the device 1000, and may provide the card information which relates to the selected card and coupon information stored in the device 1000 to the POS terminal 2000. In this case, the POS terminal 2000 may settle an amount reflecting the coupon information via the settlement server 3000 by using the card information and the coupon information. However, the present exemplary embodiment is not limited thereto.

The memory 1500 stores various pieces of information that the device 1000 may use in order to select a suitable card based on various settlement environments and in order to provide card information which relates to the selected card to the POS terminal 2000. The memory 1500 may store information which relates to respective priorities of cards which correspond to the various settlement environments and priorities of the various environments.

The transceiver 1600 transmits and/or receives the various pieces of information, which the device 1000 may use in order to select a suitable card based on the various settlement environments, and the card information which relates to the selected card to or from the POS terminal 2000 and the settlement server 3000.

The controller 1700 controls the overall operation of the device 1000. The controller 1700 controls the card information storage unit 1100, the card history storage unit 1105, the settlement environment information acquisition unit 1200, the card selection unit 1300, the card information providing unit 1400, the memory 1500, and the transceiver 1600 so that the device 1000 may select a suitable card based on the various settlement environments and may provide card information which relates to the selected card to the POS terminal 2000. Further, the controller 1700 may display a settlement window for a card that is recommended by the device 1000 or selected by a user, and may display card information variably based on a display mode of the device 1000.

The controller 1700 may match location information of the device 1000 with a card, and may recommend a predetermined card according to a location of the device. In addition, the controller 1700 may extract a store name from user's schedule information and may match a predetermined card to an extracted store name.

Figure 13:
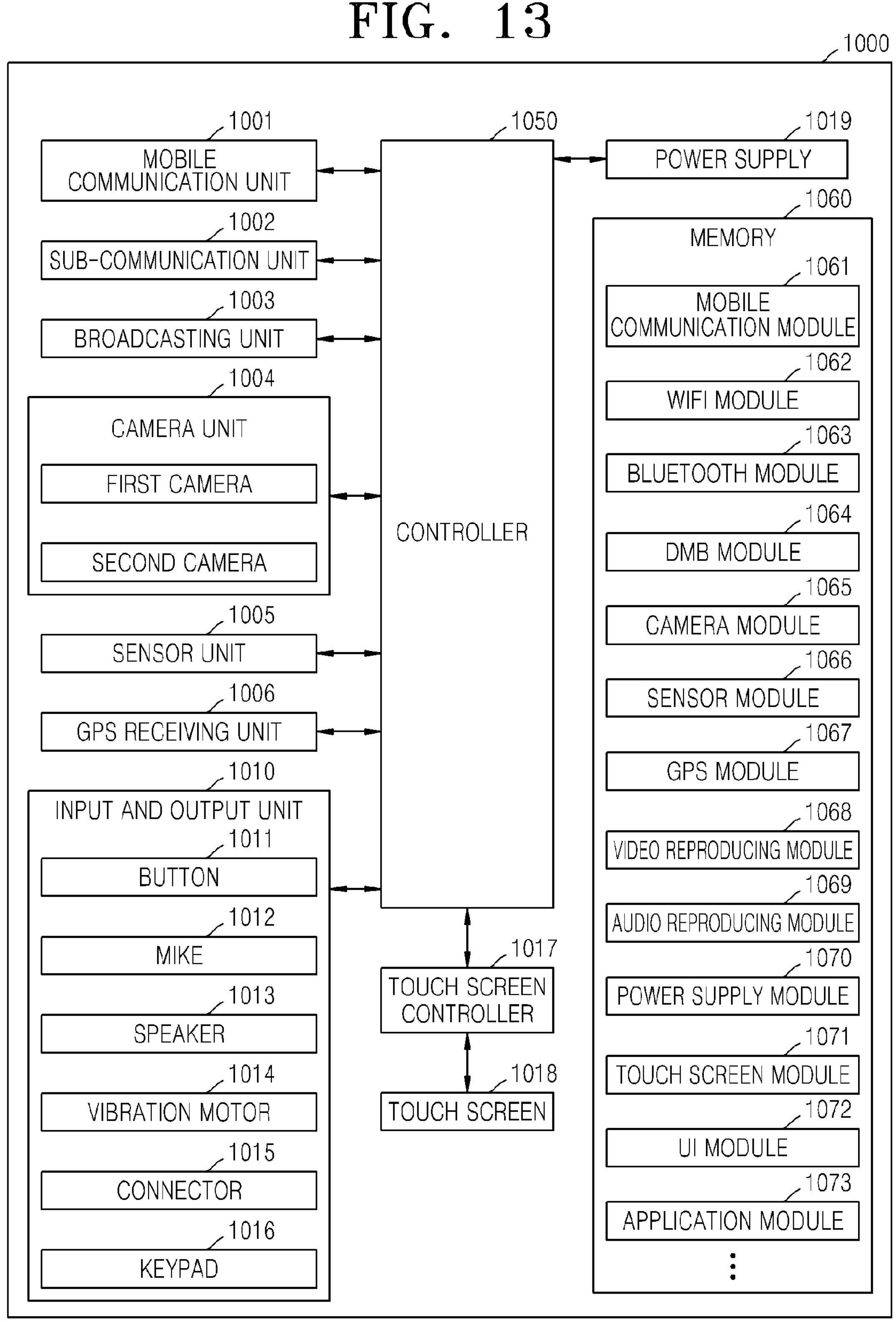
FIG. 13 is a block diagram of a device, according to another exemplary embodiment.

FIG. 13 is a block diagram of a device 1000, according to another exemplary embodiment.

A mobile communication unit 1001 performs call setting and data communication with a base station via a cellular network, such as a 3rd generation (3G) or 4th generation (4G) cellular network. A sub-communication unit 1002 performs local communication, such as Bluetooth or near field communication (NFC). A broadcasting unit 1003 receives a digital multimedia broadcasting (DMB) signal.

A camera unit 1004 includes a lens and optical devices that may be used for taking pictures or videos.

A sensor unit 1005 may include any one or more of a gravity sensor that senses a motion of the device 1000, an illuminance sensor that senses the brightness of light, a proximity sensor that senses a proximity degree of a person, and a motion sensor that senses a motion of a person.

A GPS receiving unit 1006 receives a GPS signal from a satellite. Various services may be provided to users by using the received GPS signal.

An input and output unit 1010 provides an interface with an external device or a user. The input and output unit 1010 includes a button 1011, a microphone 1012, a speaker 1013, a vibration motor 1014, a connector 1015, and a keypad 1016.

A touch screen 1018 receives a touch input of a user. The touch input may include, for example, a touch input which is created by performing a drag gesture, or a touch input which is created by performing a tap gesture. A touch screen controller 1017 transmits the touch input which is received via the touch screen 1018 to a controller 1050. A power supply 1019 is connected to a battery or an external power source in order to supply power to the device 1000.

The controller 1050 selects a card based on a settlement environment by executing one or more programs which are stored in a memory 1060, and provides card information which relates to the selected card to the POS terminal 2000.

The programs stored in the memory 1060 may be classified into a plurality of modules based on functions thereof. In particular, the programs stored in the memory 1060 may be classified into a mobile communication module 1061, a WiFi module 1062, a Bluetooth module 1063, a DMB module 1064, a camera module 1065, a sensor module 1066, a GPS module 1067, a video reproducing module 1068, an audio reproducing module 1069, a power supply module 1070, a touch screen module 1071, a user interface (UI) module 1072, an application module 1073, and/or any other module which corresponds to a suitable function. One of ordinary skill in the art may intuitively infer a function of each module from the name thereof.

Here, only the application module 1073 is described in detail. The application module 1073 stores respective card information and respective card history information which corresponds to each card.

Further, the application module 1073 acquires information which relates to a settlement environment. The application module 1073 uses the WiFi module 1062, the camera module 1065, the sensor module 1066, and the GPS module 1067 to acquire the information which relates to a settlement environment. IN addition, the application module 1073 may acquire the information which relates to a settlement environment from at least one of the POS terminal 2000 and the settlement server 3000.

The application module 1073 may determine a card to be used in a settlement in an acquired settlement environment by using card benefit information and a settlement history.

The application module 1073 may determine priorities of cards for a settlement environment based on any one or more of various criteria, based on a combination of at least one of a settlement time, a settlement location, a settlement purpose, a points accumulation rate according to settlement, a points accumulation limit, a discount rate according to settlement, and a discount limit. Further, the application module 1073 may extract a card based on respective priorities of settlement environments, and may recommend a card to be used in a settlement by comparing respective benefits of the extracted cards with each other. However, the present exemplary embodiment is not limited thereto.

The application module 1073 may automatically select a card to be used in a settlement based on a display mode of the device 1000, or may select the card to be used in a settlement based on a received user input.

The application module 1073 may display a settlement window which corresponds to a card that is recommended by the device 1000 or selected by a user, and may display card information variably based on the display mode of the device 1000.

The application module 1073 transmits card information which relates to the selected card to the POS terminal 2000. The application module 1073 may transmit the card information to the POS terminal 2000 by using at least one of the mobile communication module 1061, the WiFi module 1062, the Bluetooth module 1063, and an NFC module (not shown).

The application module 1073 may match location information of the device 1000 with a card, and may recommend a predetermined card according to a location of the device 1000. Also, the application module 1073 may extract a store name from user's schedule information, and may match a predetermined card to an extracted store name.

Figure 14:
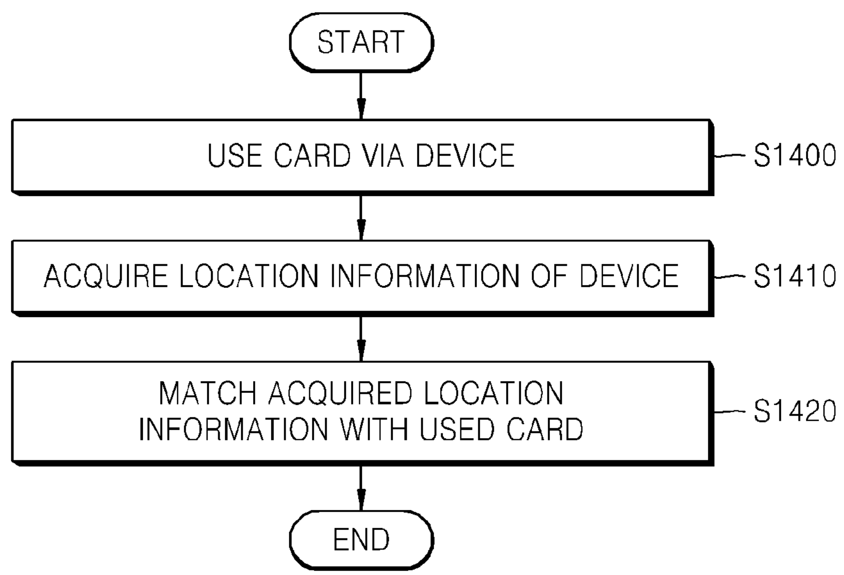
FIG. 14 is a flowchart which illustrates a method by which a device matches location information with card information, according to an exemplary embodiment.

FIG. 14 is a flowchart which illustrates a method by which a device 1000 matches location information with card information, according to an exemplary embodiment;

In operation S1400, the device 1000 uses a card via the device 1000. For example, the device 1000 may use at least one of a credit card, a point card, and a membership card, which are stored in the device 1000.

The device 1000 may use a discount coupon stored in the device 1000. The device 1000 may receive a discount coupon via a short message service (SMS) or a multimedia message service (MMS), and may store the received discount coupon in the device 1000.

Also, the device 1000 may use a card stored in another device (not shown) of a user using the device 1000 or an external server (not shown).

In operation S1410, the device 1000 acquires location information of the device 1000. The location information may include, for example, information about a GPS value of the device 1000 and an identification value of an AP connected to the device 1000. However, the inventive concept is not limited thereto.

In operation S1420, the device 1000 matches acquired location information with a card used thereby. The device 1000 may match a card used thereby with at least one of the GPS value of the device 1000 and the identification value of the AP connected to the device 1000. Also, the device 1000 may match a discount coupon used thereby with at least one of the GPS value of the device 1000 and the identification value of the AP connected to the device 1000. In this case, the discount coupon may be included in text messages received from another device or the external server by the device 1000. However, the inventive concept is not limited thereto. In addition, the device 1000 may match a phone number of the other device or the external server, which provides the discount coupon, with at least one of the GPS value of the device 1000 and the identification value of the AP connected to the device 1000.

Figure 15:
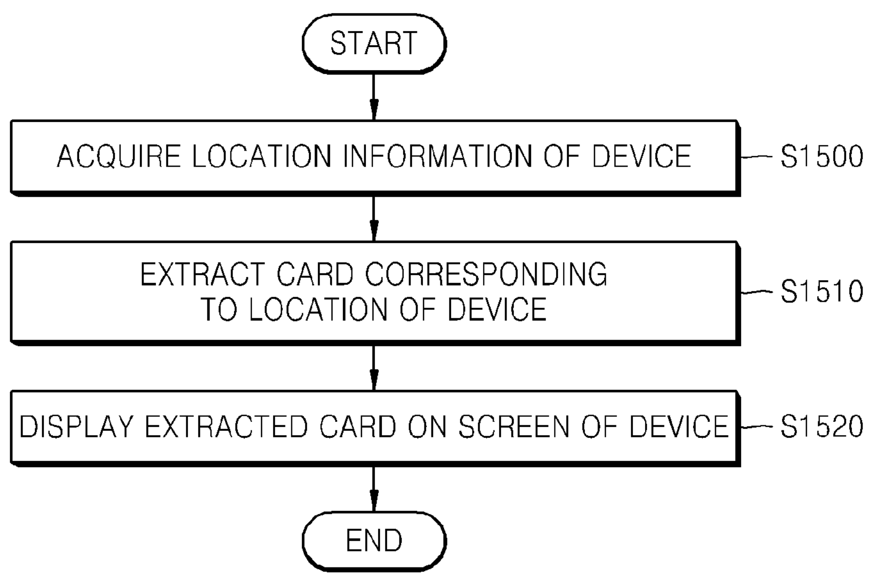
FIG. 15 is a flowchart which illustrates a method by which a device recommends a card based on location information, according to an exemplary embodiment.

FIG. 15 is a flowchart which illustrates a method by which a device 1000 recommends a card based on location information, according to an exemplary embodiment.

In operation S1500, the device 1000 acquires location information of the device 1000. For example, the device 1000 may acquire an GPS value indicating a location of the device 1000 by using a GPS sensor in the device 1000. In addition, the device 1000 may check a location of the device 1000 by using the identification value of the AP connected to the device 1000.

In operation S1510, the device 1000 extracts a card corresponding to the location of the device 1000. For example, the device 1000 may extract a card corresponding to the GPS value indicating a location of the device 1000 or the identification value of the AP connected to the device 1000. The device 1000 may extract at least one of a credit card, a membership card, and a point card, which correspond to the location of the device 1000. In addition, the device 1000 may extract a discount coupon or a text message including a discount coupon, which corresponds to the location of the device 1000.

When a plurality of cards are extracted, the device 1000 may recommend a card which a user frequently uses from among the extracted cards, based on a card use history of the user. The device 1000 may recommend a card providing a high discount rate or a high accumulation rate from among the extracted cards, based on a card use history of the user.

In operation S1520, the device 1000 displays an extracted card on a screen of the device 1000. When a plurality of cards are extracted, the device 1000 may arrange the extracted cards based on a discount rate or an accumulation rate. The device 1000 may display a discount coupon or a text message including a discount coupon, as well as the extracted card.

Figure 16:
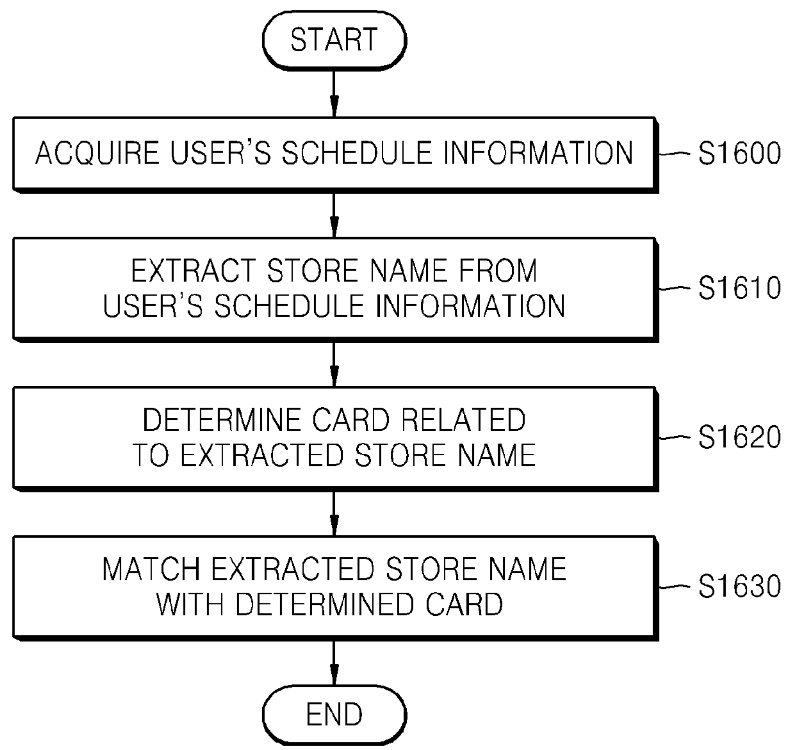
FIG. 16 is a flowchart which illustrates a method by which a device matches a store name extracted from user's schedule information with a card, according to an exemplary embodiment.

FIG. 16 is a flowchart which illustrates a method by which a device 1000 matches a store name extracted from user's schedule information with a card, according to an exemplary embodiment.

In operation S1600, the device 1000 acquires user's schedule information. The device may acquire the user's schedule information stored in the device 1000 via a calendar application installed in the device 1000. The user's schedule information stored in the device 1000 via a calendar application installed in the device 1000 may be schedule data that is matched to a predetermined date of the calendar and is stored in the device 1000. The device 1000 may receive user's schedule information stored in a server from the server.

In S1610, the device 1000 extracts a store name from the user's schedule information. For example, when information "a meeting with my friend in an XX department store at 18:00 on April 15" is included in the user's schedule information, the device 1000 may extract the "XX department store" from the user's schedule information. In this case, various stores' names may be stored in the device 1000 or the server in advance, and the device 1000 may extract the "XX department store" from the user's schedule information based on the stored various stores' names.

In operation S1620, the device 1000 may determine a card related to the extracted store name. The device 1000 may determine a card related to an extracted store name from among a credit card, membership card, and point card of a user. The card related to the extracted store name may be a card to which benefits, such as discount, coupons, and points, are provided when the card is used in a store having the extracted store name.

The device 1000 may determine a discount coupon related to the extracted store name from among discount coupons of a user. The discount coupon related to the extracted store name may be a discount coupon that can be used in a store having the extracted store name.

When a plurality of cards are determined, the device 1000 may recommend a card which a user frequently uses from among the determined cards, based on a card use history of the user. The device 1000 may recommend a card providing a high discount rate or accumulation rate from among the determined cards, based on a card use history of the user.

In operation S1630, the device 1000 matches an extracted store name with a determined card. In addition, the device 1000 may match the extracted store name with a determined discount coupon. The device 1000 may correct location information related to a store name, and may store the corrected location information. In this case, the location information related to a store name may include, for example, a GPS value indicating a location of a store, an identification value of a POS terminal (e.g., the POS terminal 200 of FIG. 1) of the store, and an identification value of an AP installed in the store. However, the inventive concept is not limited thereto.

Figure 17:
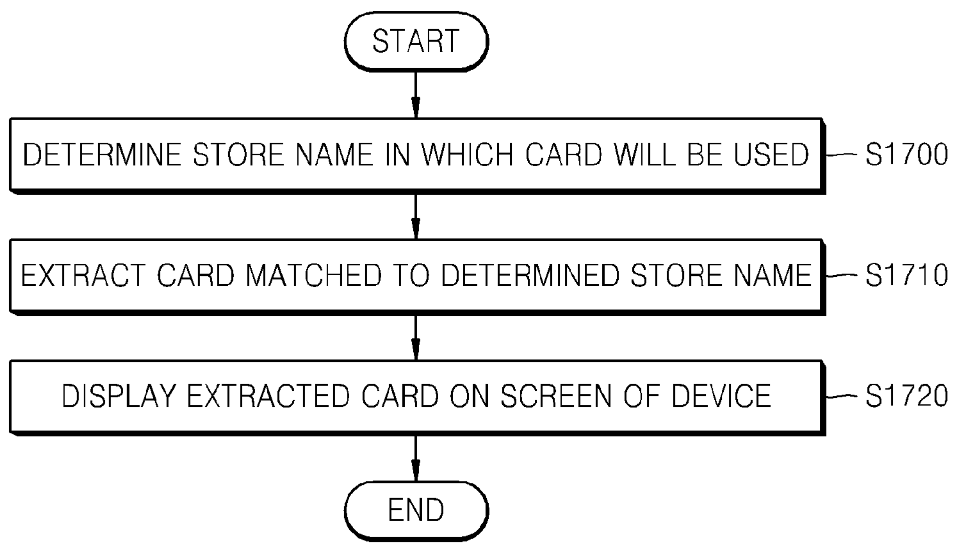
FIG. 17 is a flowchart which illustrates a method by which a device displays card information about a card matched to a predetermined store name, according to an exemplary embodiment.

FIG. 17 is a flowchart which illustrates a method by which a device 1000 displays card information about a card matched to a predetermined store name, according to an exemplary embodiment.

In operation S1700, the device 1000 determines a store name in which a card will be used. The device 1000 may acquire a GPS value indicating the current location of the device 1000, and may determine a store name corresponding to the acquired GPS value as a store name in which a card will be used. In addition, the device 1000 may receive an identification value of an AP connected to the device 1000 from the AP, and may determine a store name corresponding to the received identification value of the AP as a store name in which a card will be used. In this case, the identification value of the AP may include, for example, a service set identifier (SSID) of the AP and a media access control (MAC) address of the AP. However, the inventive concept is not limited thereto. The device 1000 may receive a store name from a user, and may determine the received store name as a store name in which a card will be used.

The device 1000 may receive a store name from a POS terminal (e.g., the POS terminal 200 of FIG. 1), and may determine the received store name as a store name in which a card will be used. In addition, the device 1000 may receive an identification value of the POS terminal from the POS terminal, and may determine a store name corresponding to the identification value of the POS terminal as a store name in which a card will be used.

In operation S1710, the device 1000 extracts a card matched to the determined store name. For example, the device 1000 may extract at least one of a credit card, a membership card, and a point card, which correspond to the determined store name. The device 1000 may extract a discount coupon or a text message including a discount coupon, which corresponds to the determined store name.

In operation S1720, the device 1000 displays an extracted card on a screen of the device 1000. When a plurality of cards are extracted, the device 1000 may arrange the extracted cards based on a discount rate or an accumulation rate. The device 1000 may display a discount coupon or a text message including a discount coupon, as well as the extracted card.

Figure 18:
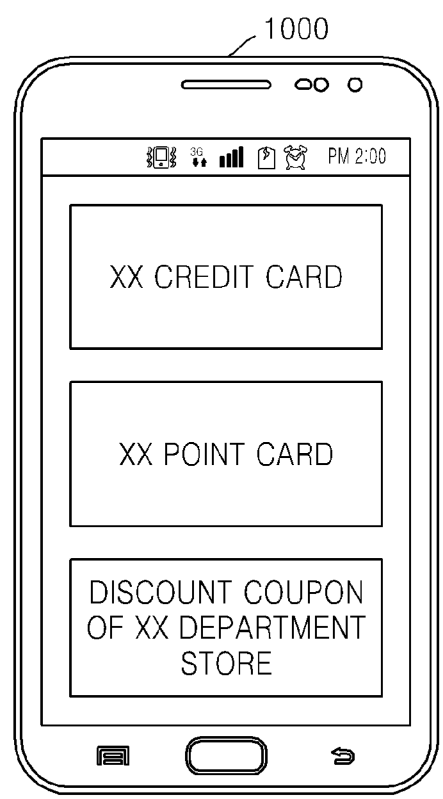
FIG. 18 is a diagram illustrating an example in which a card related to a location of a device or a store name is displayed on a screen of the device, according to an exemplary embodiment.

FIG. 18 is a diagram illustrating an example in which a card related to a location of a device 1000 or a store name is displayed on a screen of the device 1000, according to an exemplary embodiment.

For example, when the device 1000 is located in an "XX department store", the device 1000 may display an "XX credit card", an "XX point card", and an "discount coupon of XX department store" on the screen of the device 1000, based on location information of the device 1000 or a store name determined in the device 1000.

The one or more exemplary embodiments may be embodied as a transitory or non-transitory computer-readable recording medium, e.g., a program module to be executed in computers, which include computer-readable commands. The computer-readable recording medium may include any usable medium that may be accessed by computers, volatile and non-volatile media, and detachable and non-detachable media. Also, the computer-readable recording medium may include a computer storage medium and a communication medium. The computer storage medium includes all of volatile and non-volatile media, and detachable and non-detachable media that are designed to store information including computer readable commands, data structures, program modules, and/or other data. The communication medium may include any one or more of computer-readable commands, a data structure, a program module, and other transmission mechanisms, and may include other information transmission mediums.

The present inventive concept may, however, be embodied in many different forms and should not be construed as being limited to the exemplary embodiments set forth herein; rather, these exemplary embodiments are provided so that the present disclosure will be thorough and complete, and will fully convey the present inventive concept to those of ordinary skill in the art. For example, configuring elements that are singular forms may be executed in a distributed fashion, and also, configuring elements that are distributed may be combined and then executed.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

What is claimed is:

1. A method for determining, by a mobile phone, a card to be used in a settlement, the method comprising:

acquiring a card use history of a card which is usable via the mobile phone;

acquiring information which relates to a settlement environment of the phone;

determining, by the mobile phone, whether the card is to be used in the settlement, based on the acquired information which relates to the settlement environment and the acquired card use history;

displaying an interface on a screen of the mobile phone to enter authentication information in a locked state of screen;

performing a settlement while the screen remains in the locked state of screen; and providing settlement information which relates to the determined card to a point of sale (POS) terminal.

2. The method of claim 1, wherein the acquiring the information which relates to the settlement environment comprises acquiring information which relates to a location of the mobile phone, and the determining the card comprises determining the card to be used in the settlement based on the acquired information which relates to the location of the mobile phone.

3. The method of claim 1, wherein the determining the card comprises extracting cards which relate to the settlement environment based on the card use history, comparing respective benefits of the extracted cards with each other, and using a result of the comparing to determine a recommendation with respect to a card to be used in the settlement.

4. The method of claim 3, wherein the card use history comprises at least one of a card number, a settlement time, a settlement date, a settlement location, and a name of goods.

5. The method of claim 3, wherein an image of the card which relates to the determined recommendation is displayed on an unlock screen of the mobile phone, and the determining the card comprises determining the card based on a received user input which relates to the card image displayed on the unlock screen of the device.

6. The method of claim 3, wherein when the settlement to be conducted by using the determined card is safely performable, at least a portion of a settlement window of the determined card is displayed in a predetermined color.

7. The method of claim 3, further comprising determining a display mode of the mobile phone, wherein the determining the card comprises determining whether to display a list of recommended cards on a screen of the mobile phone based on the determined display mode and selecting a card to be used in the settlement based on a received user input which relates to the displayed list of recommended cards.

8. The method of claim 1, further comprising receiving information which relates to goods from the POS terminal, wherein the received information which relates to the goods comprises at least one of a current date, a current time, an expiration date of the goods, an identification value of the goods, a cost of the goods, and an identification value of a member store which corresponds to the POS terminal.

9. The method of claim 8, wherein the display mode comprises at least one of a horizontal view mode and a vertical view mode.

10. The method of claim 8, wherein the receiving the information which relates to the goods from the POS terminal comprises receiving the information which relates to the goods from the POS terminal via near field communication (NFC), and the providing the settlement information which relates to the determined card comprises providing the settlement information to the POS terminal via NFC.

11. The method of claim 1, wherein the settlement is determined to be safely performable based on an authentication of a user of the card.

12. A mobile phone for determining a card to be used in a settlement, the mobile phone comprising:

- a card history storage which is configured to store a card use history of a card which is usable via the mobile phone;
- a settlement environment information acquirer which is configured to acquire information which relates to a settlement environment of the mobile phone;
- a card selector which is configured to select a card to be used in the settlement, based on the acquired information which relates to the settlement environment and the stored card use history;
- a display configured to display an interface on a screen of the mobile phone to enter authentication information in a locked state of screen;
- a controller configured to perform the settlement while the screen remains in the locked state of screen; and
- a card information provider which is configured to provide settlement information which relates to the selected card to a point of sale (POS) terminal.

13. The mobile phone of claim 12, wherein the settlement environment information acquirer is further configured to acquire information which relates to a location of the mobile phone, and the card selector is further configured to determine the card to be used in the settlement based on the acquired information which relates to the location of the mobile phone.

14. The mobile phone of claim 12, wherein the card selector is further configured to extract cards which relate to the settlement environment based on the stored card use history, to compare respective benefits of the extracted cards with each other, and to use a result of the comparison to determine a recommendation with respect to a card to be used in the settlement.

15. The mobile phone of claim 14, wherein the card use history comprises at least one of a card number, a settlement time, a settlement date, a settlement location, and a name of goods.

16. The mobile phone of claim 14, wherein an image of the card which relates to the determined recommendation is displayed on an unlock screen of the mobile phone, and the card selector is further configured to select the card based on a received user input which relates to the card image displayed on the unlock screen of the mobile phone.

17. The mobile phone of claim 14, wherein when the settlement to be conducted by using the selected card is safely performable, at least a portion of a settlement window of the selected card is displayed in a predetermined color.

18. The mobile phone of claim 14, wherein the card selector is further configured to determine whether to display a list of recommended cards on a screen of the phone based on a display mode of the mobile phone, and to select a card to be used in the settlement based on a received user input which relates to the displayed list of recommended cards.

19. The mobile phone of claim 18, wherein the display mode comprises at least one of a horizontal view mode and a vertical view mode.

20. The mobile phone of claim 12, wherein the card information provider is further configured to provide the settlement information to the POS terminal via near field communication (NFC).

21. The mobile phone of claim 12, wherein the controller is further configured to determined that the settlement is safely performable based on an authentication of a user of the card.

22. A non-transitory computer-readable recording medium having recorded thereon a program for executing a method for determining, by a mobile phone, a card to be used in a settlement, the method comprising:

- acquiring a card use history of a card which is usable via the mobile phone;
- acquiring information which relates to a settlement environment of the phone;
- determining, by the mobile phone, whether the card is to be used in the settlement, based on the acquired information which relates to the settlement environment and the acquired card use history;

displaying an interface on a screen of the mobile phone to enter authentication information in a locked state of screen;

performing a settlement while the screen remains in the locked state of screen; and providing settlement information which relates to the determined card to a point of sale (POS) terminal.

23. The non-transitory computer-readable recording medium of claim 22, wherein the settlement is determined to be safely performable based on an authentication of a user of the card.

* * * * *